US009841749B2

(12) United States Patent
Linnell et al.

(10) Patent No.: US 9,841,749 B2
(45) Date of Patent: Dec. 12, 2017

(54) RUNTIME CONTROLLER FOR ROBOTIC MANUFACTURING SYSTEM

(71) Applicant: Bot & Dolly, LLC, San Francisco, CA (US)

(72) Inventors: Jeffrey Linnell, Woodside, CA (US); Kendra Byrne, San Francisco, CA (US); Matthew Bitterman, San Francisco, CA (US)

(73) Assignee: Bot & Dolly, LLC, San Francisco, CA (US)

( * ) Notice: Subject to any disclaimer, the term of this patent is extended or adjusted under 35 U.S.C. 154(b) by 19 days.

(21) Appl. No.: 14/242,840

(22) Filed: Apr. 1, 2014

(65) Prior Publication Data

US 2015/0277430 A1      Oct. 1, 2015

(51) Int. Cl.
*G05B 19/409* (2006.01)
*G05B 19/42* (2006.01)

(52) U.S. Cl.
CPC .......... *G05B 19/409* (2013.01); *G05B 19/42* (2013.01); *G05B 2219/36056* (2013.01); *G05B 2219/39432* (2013.01); *G05B 2219/39443* (2013.01)

(58) Field of Classification Search
CPC .. G05B 19/409; G05B 19/4182; G05B 19/42; G05B 19/423; G05B 2219/39443;
(Continued)

(56) References Cited

U.S. PATENT DOCUMENTS 4,140,953 A * 2/1979 Dunne ................. G05B 19/409
                                                318/568.13
4,420,812 A * 12/1983 Ito ...................... G05B 19/4182
                                                318/573
(Continued)

FOREIGN PATENT DOCUMENTS

EP      1145804      10/2001
EP      1710644      10/2006
(Continued)

OTHER PUBLICATIONS

Bengtsson, K. et al., "Sequence Planning Using Multiple and Coordinated Sequences of Operations," IEEE Transactions on Automation Science and Engineering, 2012, pp. 308-319, vol. 9, No. 2.
(Continued)

*Primary Examiner* — Thomas G Black
*Assistant Examiner* — Ce Li
(74) *Attorney, Agent, or Firm* — Fish & Richardson P.C.

(57) ABSTRACT

Example systems and methods allow for runtime control of robotic devices during a construction process. One example method includes determining at least one sequence of robot operations corresponding to at least one robot actor, causing the at least one robot actor to execute a portion of the at least one sequence of robot operations during a first time period, receiving an interrupt signal from a mobile computing device indicating a modification to the at least one sequence of robot operations, where the mobile computing device is configured to display a digital interface including one or more robot parameters describing the at least one robot actor and one or more tool parameters describing operating characteristics of at least one physical tool, and causing the at least one robot actor to execute a portion of the at least one modified sequence of robot operations during a second time period.

13 Claims, 19 Drawing Sheets

(58) Field of Classification Search
CPC ........... G05B 2219/39432; G05B 2219/36056;
G05B 2219/34388; G05B 2219/45013;
G05B 2219/36458; G05B 2219/36471;
G05B 2219/39468; G05B 2219/36159
See application file for complete search history.

(56) References Cited

U.S. PATENT DOCUMENTS

| | | | |
|---|---|---|---|
| 4,860,428 A * | 8/1989 | Brolund | B21D 37/145 |
| | | | 483/29 |
| 5,937,143 A * | 8/1999 | Watanabe | B25J 9/1671 |
| | | | 700/264 |
| 5,949,683 A * | 9/1999 | Akami | G05B 19/425 |
| | | | 700/123 |
| 5,950,006 A | 9/1999 | Crater et al. | |
| 5,993,365 A * | 11/1999 | Stagnitto | B25J 15/0491 |
| | | | 414/736 |
| 6,161,051 A | 12/2000 | Hafemann et al. | |
| 6,522,949 B1 * | 2/2003 | Ikeda | G05B 19/425 |
| | | | 219/121.63 |
| 6,522,951 B2 | 2/2003 | Born et al. | |
| 6,718,533 B1 | 4/2004 | Schneider et al. | |
| 7,298,385 B2 | 11/2007 | Kazi et al. | |
| 7,542,918 B2 | 6/2009 | Rolleston Phillips | |
| 7,590,680 B2 | 9/2009 | Fernando et al. | |
| 7,890,194 B2 | 2/2011 | Pannese | |
| 7,945,348 B2 | 5/2011 | Pannese et al. | |
| 8,073,567 B2 | 12/2011 | Nishi et al. | |
| 8,082,769 B2 | 12/2011 | Butscher et al. | |
| 8,229,587 B2 | 7/2012 | Shieh et al. | |
| 8,483,881 B2 | 7/2013 | Ermakov et al. | |
| 8,614,559 B2 | 12/2013 | Kassow et al. | |
| 8,639,666 B2 | 1/2014 | Densham et al. | |
| 8,660,738 B2 | 2/2014 | Faivre et al. | |
| 2001/0004718 A1 | 6/2001 | Gilliland et al. | |
| 2004/0199290 A1 * | 10/2004 | Stoddard | B25J 9/1669 |
| | | | 700/248 |
| 2005/0119791 A1 | 6/2005 | Nagashima | |
| 2006/0145647 A1 | 7/2006 | Kitatsuji et al. | |
| 2006/0200254 A1 | 9/2006 | Krause | |
| 2006/0229761 A1 * | 10/2006 | Kita | G05B 19/4068 |
| | | | 700/181 |
| 2006/0276934 A1 | 12/2006 | Nihei et al. | |
| 2008/0014058 A1 | 1/2008 | Hongkham et al. | |
| 2009/0112350 A1 | 4/2009 | Yuan et al. | |
| 2009/0289591 A1 * | 11/2009 | Kassow | B25J 9/1671 |
| | | | 318/568.13 |
| 2010/0312387 A1 | 12/2010 | Jang et al. | |
| 2010/0332017 A1 | 12/2010 | Stummer | |
| 2011/0190938 A1 * | 8/2011 | Ekelund | G05B 19/409 |
| | | | 700/264 |
| 2012/0072019 A1 | 3/2012 | Sanders et al. | |
| 2012/0188350 A1 * | 7/2012 | Hammond | H04N 5/23203 |
| | | | 348/61 |
| 2012/0215354 A1 | 8/2012 | Krasny et al. | |
| 2012/0307027 A1 | 12/2012 | Popovic et al. | |
| 2013/0331959 A1 | 12/2013 | Kawai | |
| 2015/0190925 A1 * | 7/2015 | Hoffman | B25J 9/161 |
| | | | 700/257 |

FOREIGN PATENT DOCUMENTS

| | | | |
|---|---|---|---|
| JP | EP 1145804 A1 * | 10/2001 | ........... G05B 19/425 |
| WO | 2010025768 | 3/2010 | |
| WO | 2010045968 | 4/2010 | |
| WO | 2014/003864 | 1/2014 | |

OTHER PUBLICATIONS

Chen et al., "Simulation and Graphical Interface for Programming and Visualization of Sensor-based Robot Operation," Proceedings of the 1992 IEEE International Conference on Robotics and Automation, Nice, France, May 1992, pp. 1095-1110.
El-Hakim, "A system for indoor 3-d mapping and virtual environments," Proceedings of the SPIE—The International Society for Optical Engineering, 1997, pp. 21-35, vol. 3174.
Li et al., "Fuzzy Target Tracking Control of Autonomous Mobile Robots by Using Infrared Sensors," IEEE Transactions on Fuzzy Systems, Aug. 2004, pp. 491-501, vol. 12, No. 4.
Roll Jr. et al., "Targeting and sequencing algorithms for the Hectospec's optical fiber robotic positioner," Proceedings of the SPIE—The International Society for Optical Engineering, 1998, pp. 324-332, vol. 3355.
Sanhoury et al., "Switching between formations for multiple mobile robots via synchronous controller," 2012 IEEE 8th International Colloquium on Signal Processing and its Applications (CSPA), 2012, pp. 352-357.
Zhang, Peng, "Chapter 3—System Interfaces for Industrial Control," Industrial Control Technology: A Handbook for Engineers and Researchers, 2008, pp. 259-427.
International Search Report dated Jun. 23, 2015.
Grasshopper [online], available online on or before May 19, 2009, [retrieved on Aug. 17, 2017] Retrieved from the Internet: URL (2009 version): <https://web.archive.org/web/20090519001653/http://www.grasshopper3d.com/> (2017 version): < http://www.grasshopper3d.com/>, 20 total pages.
Rhinoceros [online], available online on or before Dec. 23, 1996, [retrieved on Aug. 17, 2017] Retrieved from the Internet: URL (1996 version): <https://web.archive.org/web/19961223083529/https://www.rhino3d.com/> (2017 version): <https://www.rhino3d.com/>, 4 total pages.
Wikipedia [online], "Grasshopper 3D," last updated Aug. 12, 2017, [retrieved on Aug. 17, 2017], Retrieved from the Internet: URL<https://en.wikipedia.org/wiki/Grasshopper_3D>, 5 pages.
Wikipedia [online], "Rhinosceros 3D," last updated Jun. 26, 2017, [retrieved on Aug. 17, 2017], Retrieved from the Internet: URL<https://en.wikipedia.org/wiki/Rhinoceros_3D>, 6 pages.

* cited by examiner

RUNTIME CONTROLLER FOR ROBOTIC MANUFACTURING SYSTEM

BACKGROUND

Unless otherwise indicated herein, the materials described in this section are not prior art to the claims in this application and are not admitted to be prior art by inclusion in this section.

Automated manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, that may be used during a construction process. The robotic devices may be programmed with sequences of specific motion commands and commands for other operations in order to cause the robotic devices to complete a manufacturing process.

SUMMARY

The present disclosure provides methods and apparatuses that allow for runtime control of robotic devices during a building process. In particular, one or more robot actors may be configured to execute sequences of robot operations, which may include robot movements and tool actions involving the use of one or more physical tools. During the building process, a digital interface may be displayed on a mobile computing device. The digital interface may contain robot parameters describing the robot actors and tool parameters describing operating characteristics of the physical tools. A user may cause the computing device to send an interrupt signal by interacting with the digital interface (e.g., by providing touch input to a touch-based interface). Based on the interrupt signal, operation of the robot actors may be controlled or adjusted during the construction process. For instance, the user may override a parameter or otherwise adjust a different aspect of the sequences of robot operations.

In one example, a method is provided that includes determining at least one sequence of robot operations corresponding to at least one robot actor, where the robot operations include a plurality of robot movements and at least one tool action, where a tool action includes a manipulation of at least one physical tool by at least one robot actor. The method may further include causing the at least one robot actor to execute a portion of the at least one sequence of robot operations during a first time period. The method may also include receiving an interrupt signal from a mobile computing device indicating a modification to the at least one sequence of robot operations, where the mobile computing device is configured to display a digital interface during the first time period, where the digital interface includes one or more robot parameters describing the at least one robot actor and further comprises one or more tool parameters describing operating characteristics of the at least one physical tool. The method may additionally include causing the at least one robot actor to execute a portion of the at least one modified sequence of robot operations during a second time period.

In a further example, a mobile computing device including a display screen and a control system is disclosed. The control system may be configured to receive one or more robot parameters describing at least one robot actor during a first time period, where the at least one robot actor is configured to execute at least one corresponding sequence of robot operations during the first time period, where the robot operations include a plurality of robot movements and at least one tool action, where a tool action includes a manipulation of at least one physical tool by at least one robot actor. The control system may be further configured to receive one or more tool parameters describing operating characteristics of the at least one physical tool during the first time period. The control system may also be configured to cause a digital interface to be displayed on the display screen during the first time period, where the digital interface includes the one or more robot parameters and the one or more tool parameters. The control system may additionally be configured to receive a touch input on the display screen indicating a modification to the at least one sequence of robot operations. The control system may also be configured to provide instructions to cause the at least one robot actor to execute a portion of the at least one modified sequence of robot operations during a second time period.

In another example, a non-transitory computer readable medium having stored therein instructions, that when executed by a computing system, cause the computing system to perform functions is disclosed. The functions may include determining at least one sequence of robot operations corresponding to at least one robot actor, where the robot operations include a plurality of robot movements and at least one tool action, where a tool action includes a manipulation of at least one physical tool by at least one robot actor. The functions may further include causing the at least one robot actor to execute a portion of the at least one sequence of robot operations during a first time period. The functions may also include receiving an interrupt signal from a mobile computing device indicating a modification to the at least one sequence of robot operations, where the mobile computing device is configured to display a digital interface during the first time period, where the digital interface includes one or more robot parameters describing the at least one robot actor and further comprises one or more tool parameters describing operating characteristics of the at least one physical tool. The functions may additionally include causing the at least one robot actor to execute a portion of the at least one modified sequence of robot operations during a second time period.

In yet another example, a system may include means for determining at least one sequence of robot operations corresponding to at least one robot actor, where the robot operations include a plurality of robot movements and at least one tool action, where a tool action includes a manipulation of at least one physical tool by at least one robot actor. The system may further include means for causing the at least one robot actor to execute a portion of the at least one sequence of robot operations during a first time period. The system may also include means for receiving an interrupt signal from a mobile computing device indicating a modification to the at least one sequence of robot operations, where the mobile computing device is configured to display a digital interface during the first time period, where the digital interface includes one or more robot parameters describing the at least one robot actor and further comprises one or more tool parameters describing operating characteristics of the at least one physical tool. The system may additionally include means for causing the at least one robot actor to execute a portion of the at least one modified sequence of robot operations during a second time period.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
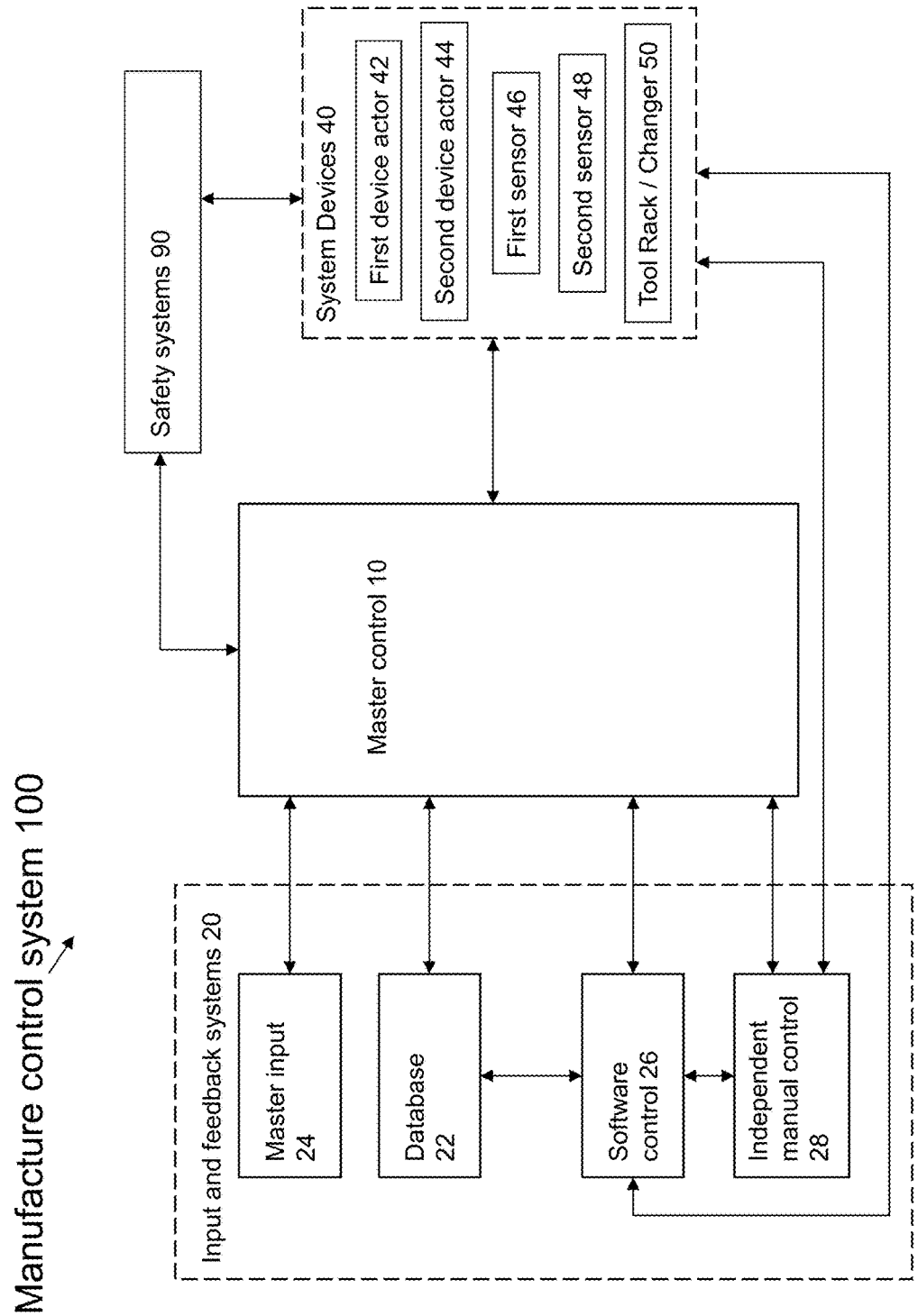
FIG. 1 shows a block diagram of a manufacture control system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments provide for runtime control of one or more robotic devices used to execute a building process within a physical workcell. For example, a mobile computing device with a touch-surface runtime controller may be manipulated by a user for real-time control of the robotic devices. Within examples, the runtime controller may allow a user to adapt a building process in real time by changing the rate at which a robotic device is performing operations, by jumping forward or backward within a sequence of operations or a timeline in order to omit or repeat certain operations, and/or by changing physical tools used by a robotic device or parameters associated with particular physical tools.

In some examples, a digital interface on a mobile computing device may display robot parameters describing information about the current state of one or more of the robot actors at particular points during execution of a building process. For instance, the robot parameters may include the current positions of robot actors (e.g., Cartesian positions or robot joint angles), tool center points used by the robot actors, physical tools currently equipped by the robot actors, axes along which the robot actors are operating, and/or other diagnostic information about the robot actors. In further examples, a user may be able to override one or more robot parameters via the digital interface (e.g., by typing in a number or sliding a digital marker along a digital slide or digital wheel). In response to the user input, an interrupt signal may then be generated in order to cause the building process to be modified using the overridden parameters.

In further examples, the digital interface may additionally display one or more tool parameters describing operating characteristics of physical tools used in the building process by the robot actors. In some examples the tool parameters may be displayed in the same screen as certain robot parameters. In other examples, the tool parameters may be displayed within a separate window that may be reachable from a menu within the digital interface. As an example, a view of the digital interface may contain a digital readout of current input/output (IO) values and diagnostics, such as the power supplied to a variable-frequency drive (VFD) or the frequency of a spindle used by a robot actor. A user may then be able to override one or more of the tool parameters used in the building process during runtime by interacting with the digital interface (e.g., by activating a touch-based digital control).

The digital interface may also display one or more additional controls that allow a user to modify the sequence of operations executed by one or more of the robot actors. For example, the user may have access to controls related to the current position of a digital marker within a digital timeline corresponding to sequences of robot operations. In some examples, the digital timeline may allow the user to cause the robot actors to jump to other points in the digital timeline, such as to skip or repeat an operation. In additional examples, controls may be provided to reverse certain operations in the building process. For instance, additional robot operations my added to a robot actor's planned sequence of operations in order to unscrew a nail that was previously screwed in by the robot actor.

In further examples, controls may be provided to change a rate at which robot actors execute operations (e.g., to make a particular operation within a building process go slower so that the user can verify its accuracy). A change to the rate of execution could be global (e.g., affecting each robot actor within a physical workcell) or specific to one or more particular robot actors. In some examples, changing a rate of execution of one or more of the robot actors my be accomplished using one or more digital wheels within the digital interface, where a position of a digital marker within a digital wheel corresponds to a particular rate of execution. In further examples, controls may be provided in order to pause and restart operation of one or more of the robot actors.

In additional examples, the digital interface may also contain controls that allow a user to cause robot actors to change tools during construction. For example, the digital interface may contain a listing of currently available tools located within a tool rack in a physical workcell. A user may then select a particular physical tool fir a particular robot actor to equip. In further examples, additional information to facilitate a tool changing process, such as calibrated tool center points and/or tool offsets, may also be displayed within the digital interface.

In additional examples, other aspects of a physical workcell or building process may be displayed within a digital interface as well or instead. For instance, sensor data received from one or more sensors within a physical workcell that may be indicative of aspects of the building process (e.g., the current state of materials used in construction) may also be displayed within the digital interface. In further examples, some or all of the information displayed on the digital interface may be received from a timing computer in communication with robotic devices and/or other system devices within a physical workcell during a building process.

II. Example Control Systems

Example embodiments may provide for motion planning and control of multi-axis robotic systems for use in the manufacturing and making industries. Example design-to-production systems may allow users to change parameters describing an output product on the front end, with the effects propagated through to a product manufactured by one or more robotic devices using one or more tools. In some examples, users may be provided with a graphical interface that allows for the configuration of the robot actors using a diverse toolset in order to automate the building process. In further examples, robot motions may be abstracted so that users don't have to program specific robot commands (e.g., motion commands or tool commands) in order to control the building process. Accordingly, users may be able to design a building process without specific knowledge of commands for particular types of robots. Additionally, users may be provided with one or more interfaces that allow for varying amounts of control over specific robot operations within a manufacturing process, during offline motion programming and/or during runtime.

In further examples, users may be provided with a three-dimensional (3D) modeling graphical interface that allows the user to alter one or more variables describing a physical workcell and/or a desired output product that affect a building process in the physical world. Additionally, the user interface may provide abstract ways to represent physical objects digitally as nodes within a software environment. In particular, the user experience may enable users to select from an array of tools which can be configured and combined in a number of different ways to control different types of robot actors and hardware components within a physical workcell.

In further examples, the physical workcell may include a physical stage or stages on which a physical building process is planned or is occurring within the physical world. In some examples, the physical workcell may include a variety of different robot actors and other hardware components as well as physical materials that may be used in the building process. In further examples, the physical workcell may contain a tool rack and/or an automated tool changer. In additional examples, the physical workcell may contain one or more different types of sensors. Also, the physical workcell may include any number of different dimensions, including platforms for particular building activities.

It should be understood that the present disclosure is not to be limited in terms of the particular embodiments described in this application, which are intended as illustrations of various aspects. Numerous components of example manufacturing systems are described herein. Systems that contain only some of those components or any combination of such components are contemplated as well. Many modifications and variations can be made without departing from the spirit and scope of the disclosed systems and methods. Functionally equivalent methods and apparatuses within the scope of the disclosure, in addition to those enumerated herein, will be apparent to those skilled in the art.

Example embodiments may involve use of a manufacture control system to create automated programming of robotics arms during a building process. FIG. 1 describes an example manufacture control system 100. Manufacture control system 100 may be part of a manufacturing environment used to control one or more robotic devices to use one or more tools to construct some output product. Manufacture control system 100 may comprise a master control 10, input and feedback systems 20, system devices 40, and safety systems 90. From the most basic perspective, manufacture control system 100 may function when an input system 20 provides instructions to one of system devices 40 via master control 10.

In one potential embodiment as part of a manufacture control system 100, input and feedback systems 20 may include a database 22, a master input 24, a software control 26, and an independent manual control 28. As part of the input and feedback systems 20, database 22 may operate to provide a set of timing and position data to direct all or a portion of device actors 42, 44 within system devices 40. Two device actors 42, 44 are shown in FIG. 1, but any number of device actors could be used within manufacture control system 100. Alternatively, database 22 may store data being created by manual or individual movement or data input related to operation and function of device actors 42, 44. Database 22 may also store data created independently of device actors 42, 44, such as data created using software modeling features of a software control 26.

A master input 24 may be any device that functions to operate all of the device actors 42, 44 associated with a particular building process being executed by manufacture control system 100. Master input 24 may function by sending input control signals to master control 10. Master control 10 may then adapt the signal from master input 24 to send individual control signals to a plurality of robot actors operating as device actors 42, 44 for a particular manufacturing process. In one potential embodiment, every individual device of device actors 42, 44 may be provided a control signal from master control 10 when a signal is received from master input 24, including a signal to maintain a status quo or non-action to devices that are not operating as device actors 42, 44 for a particular part of the manufacturing process. In an alternative embodiment, a portion of the device actors 42, 44 connected as part of manufacture control system 100 may not be sent any signal from master control 10 as part of the operation of motion control system 100 for a particular part of the manufacturing process.

In some examples, software control 26 may act as a replacement for master input 24 in sending control signals to the plurality of device actors 42, 44 via the master control 10. Alternately, software control 26 may control individual devices from among device actors 42, 44 to control particular operations of the individual device. In other potential embodiments, software control 26 may function to model the behavior of individual devices of device actors 42, 44 within a virtual modeling environment representative of a physical workcell. In such an embodiment, software control 26 may contain a software model for an individual device, which allows control signals to be created for the device without actually sending the control signals to the device. The control signals may then be stored in the software control 26, in database 22, within a computer memory component that is part of master control 10, or within computer memory that is part of the device of device actors 42, 44 for which the controls are being created. After the control signal is created by software control 26 and propagated to the appropriate storage location, a master control signal from software control 26 or from master input 24 may activate the control signal for the individual device to act in conjunction with other device actors 42, 44.

In further examples, certain devices of device actors 42, 44 may additionally have an independent manual control 28. As described above with respect to software control 26, control signals for an individual device may be created in software modeling. In addition or instead, a device may have independent manual control 28 that may be used to operate a device of device actors 42, 44. When a set of instructions is being created for an entire manufacturing process, the independent manual control 28 may be given input commands over time that are recorded to database 22 or a memory device of master control 10. During creation of a set of instructions using independent manual control 28, the independent manual control 28 may communicate directly with the associated device of device actors 42, 44. Alternatively, the independent manual control 28 may send a control signal to master control 10, which then conveys the signal to the associated device of device actors 42, 44.

The control signal may then be created either from the signal of the independent manual control 28 (e.g., a separate user interface), or from a measured feedback reading created by the operation of the associated device. Additionally, although in many situations, it may be preferable to have the independent manual control 28 actually control the associated device during control signal creation in real time, control signals may instead be created without controlling the device. For example, if input signals are expected for certain time marks, an independent manual control 28 may be operated independent of the related device, and the control operation may be recorded. Accordingly, instructions for individual device actors of device actors 42, 44 from independent manual control may be integrated into a building process as part of manufacture control system 100.

In further examples, master control 10 may allow for real-time control of components of a building system by providing a link between a virtual world (e.g., software control 26) and the physical world (e.g., a physical workcell containing device actors 42, 44). Accordingly, movements of a physical robot within the physical world may be used to drive the current position of a corresponding virtual robot in real time. Similarly, movements of a virtual robot may be used to drive the current position of a physical robot in the physical world as well or instead.

In one potential embodiment, individual control signals for specific device actors may be coordinated into a single file within a memory of a master control with a common base time provided by a master clock within the master control. During operation, the master control may extract control signals for each device actor and provide individual control signals to each device actor at the appropriate intervals. In an alternative embodiment, the master control may maintain separate individual control signal files and timing data for different device actors, and synchronize the different control signals separately from the individual control files.

In another alternative embodiment, the control data for a portion of the device actors may be transferred by a master control to a memory within an associated individual device actor. During operation, device actors having control data within memory may receive a synchronization signal that indicates a location in a global timeline, a rate of progress through a global timeline, or both.

Network support may also enable communications from master control 10 to one or more of system devices 40. In one potential embodiment, a network may comprise an EtherCAT network operating according to IEEE 1588. In such an embodiment, packets may be processed on the fly using a field bus memory management unit in each slave node. Each network node may read the data addressed to it, while the telegram is forwarded to the next device. Similarly, input data may be inserted while the telegram passes through. The telegrams may only be delayed by a few nanoseconds. On the master side, commercially available standard network interface cards or an on-board Ethernet controller can be used as a hardware interface. Using these interfaces, data transfer to the master control via direct memory access may be achieved with no CPU capacity taken up for the network access. The EtherCAT protocol uses an officially assigned Ether Type inside the Ethernet Frame. The use of this Ether Type may allow transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence may be independent of the physical order. Broadcast, multicast, and communication between slaves are possible.

Transfer directly in the Ethernet frame may be used in cases where EtherCAT components are operated in the same subnet as the master controller and where the control software has direct access to the Ethernet controller. Wiring flexibility in EtherCAT may be further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100BASE-FX) or E-Bus can be selected based on distance requirements.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system. Thus, data exchange may be completely done in hardware based on "mother" and "daughter" clocks. Each clock can simply and accurately determine the other clocks' run-time offset because the communication utilizes a logical and full-duplex Ethernet physical ring structure. The distributed clocks may be adjusted based on this value, which means that a very precise network-wide time base with a jitter of significantly less than 1 microsecond may be available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement may lead to large step changes in velocity. In an embodiment comprising EtherCAT, the EtherCAT expanded data types (timestamp data type, oversampling data type) may be introduced. The local time may be linked to the measured value with a resolution of up to 10 ns, which is made possible by the large bandwidth offered by Ethernet. The accuracy of a velocity calculation may then no longer depend on the jitter of the communication system.

Further, in an embodiment where a network comprises EtherCAT, a hot connect function may enable parts of the network to be linked and decoupled or reconfigured "on the fly". Many applications require a change in I/O configuration during operation. The protocol structure of the EtherCAT system may take account these changing configurations.

In further examples, safety systems 90 may be provided for preventative safety in detecting potential collisions between device actors in modeling the motion of the actors through a global timeline. Further, such modeling through a global timeline may be used to set safety parameters for safety systems 90. Modeling of locations and velocities of device actors through a global timeline may enable identification of unsafe zones and unsafe times in an area of a physical workcell. Such an identification may be used to set sensing triggers of object detectors that are part of an example safety system. For example, if an area within 5 feet of a certain device actor is determined to be at risk of collision, and a buffer zone of 10 additional feet is required to insure safety during operation, a LIDAR detector may be configured to detect unexpected objects and movement within a 15 foot area of the device actor during operation, and to automatically create a safety shutdown if an object is detected. In an alternative embodiment, the LIDAR detector may be configured to create a warning signal if an object is detected in a periphery of the danger zone, and only to create a shutdown if the detected object is moving toward a potential impact one.

In an alternate embodiment, safety systems 90 may include modeling of actors and models of defined safe zones. Analysis of the motion of the actors in software control may allow a modeled safety check to see if any actor collides with a defined safe zone. In some examples, safe zones may be defined by entry of fixed volumes of space into a software control, by image capture of a physical workcell. Safe zones may also be defined to be variable based on a detected motion, jerk, velocity, or acceleration of an object in a safe zone. In an alternate embodiment, a safe zone may be defined by input from transponder device data. For example, a transponder location device may be attached to a robotic device actor, and a safe zone defined by a distance from the transponder. The transponder may feed location data to software control, which may update safe zones within a software control or within a master safety control. In another embodiment, fixed safe zones may be defined within software control, and published prior to a safety PLC within a master safety control prior to operation of a building process.

In some examples, system devices 40 may additionally include one or more sensors 46 and 48, such as laser-based, infrared, or computer vision-based sensors. Master control 10 may stream data in from one or more different types of sensors located within the physical workcell. For instance, data from the sensors may reflect dimensions or other properties of parts and/or materials within a physical workcell, as well as how the parts and/or materials are currently positioned within the real world. This data may then be streamed out to one or more robotic device actors 42 and 44 within the environment to control robotic actions, such as to accurately define a pick-up point or to adjust the pressure applied to a particular material to avoid damaging the material.

In further examples, robotic device actor 42, 44 may be configurable to operate one or more tools for use in construction, such as spindles, grippers, drills, pincers, or welding irons. In some examples, robotic device actors 42, 44 may be able to switch between one or more tools during a building process using a tool rack and/or automated tool changer 50. For instance, master control 10 may contain programming logic in order to automate the selection and equipping of tools from tool rack 50. In other examples, instructions to cause one of the robotic device actors 42, 44 to change tools using the tool rack/tool changer 50 may come from independent manual control 28 as well or instead.

II. Example System Devices

Referring now to FIGS. 2A-2C and 3A-C, several non-limiting examples of system devices 40, including robotic device actors 42, 44 and a tool rack/tool changer 50 will be described. Although these figures focus on the use of robotic arms, other types of device actors 42, 44 or system devices 40 may be used in some examples as well or instead.

Figure 2A:
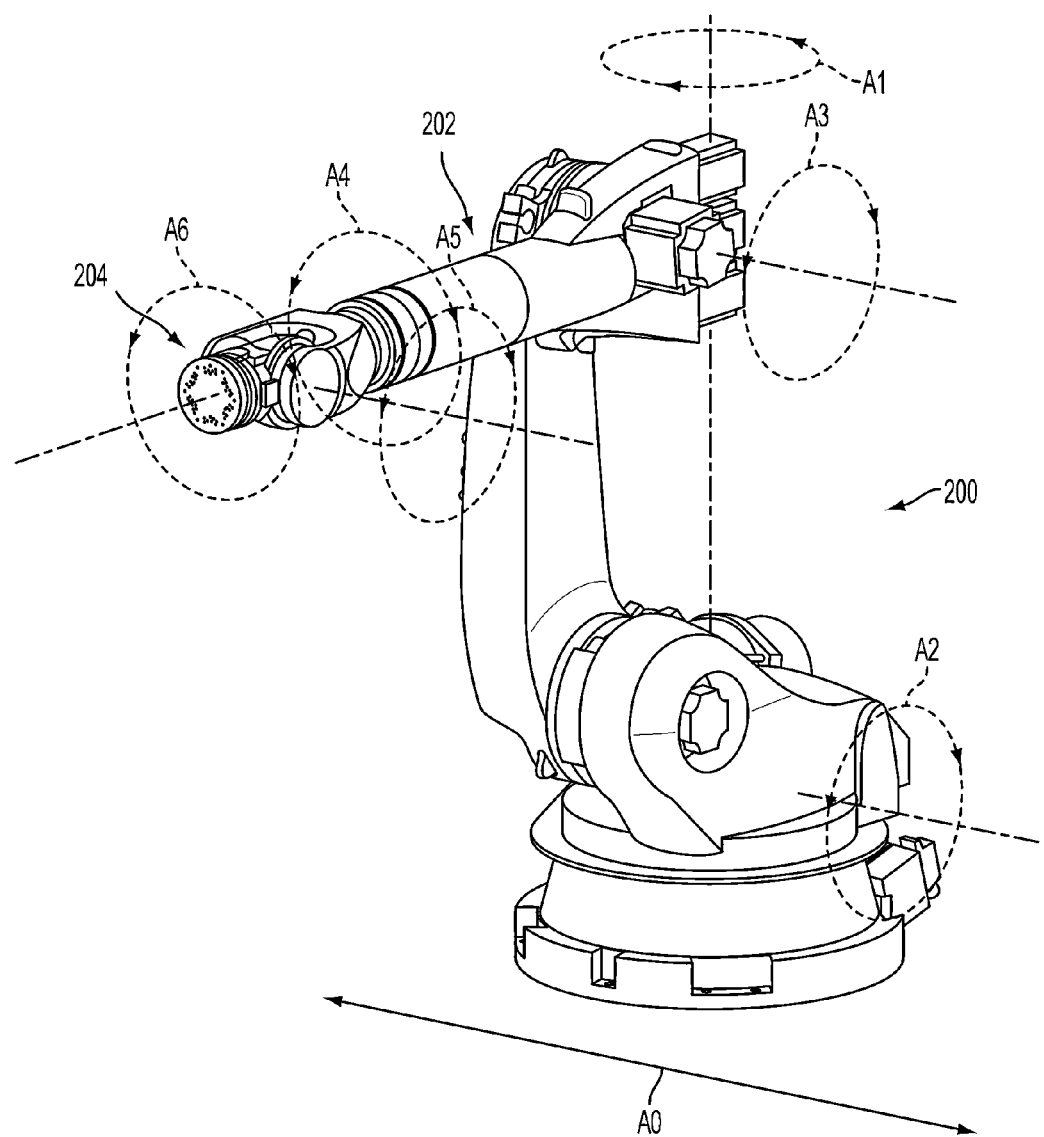
FIG. 2A shows a view of a robot with 7 degrees of freedom, according to an example embodiment.

FIG. 2A illustrates a robotic device actor, according to an example embodiment. In particular, robotic device actor 200 may include a robotic arm 202 with an end effector 204 capable of being equipped with one or more different tools. The robotic arm 202 may be capable of motion along six degrees of freedom, depicted in FIG. 2A as A1-A6. In certain examples, robotic device actor 200 may be further capable of motion along one or more axes A0, such as along a rail which is not shown that allows side to side movement. In certain embodiments, instructions may be given to position end effector 204 at a specific location, and the positions of the robotic arm 204 along A1-A6 and/or of robotic device actor 200 along one or more axes A0 may be calculated by a process of the related manufacture control system. In alternative embodiments, position control of robotic device actor 200 and/or robotic arm 202 may require separate, individual settings and control commands. Robotic devices operating with fewer degrees of freedom may be used in some examples as well or instead.

Figure 2B:
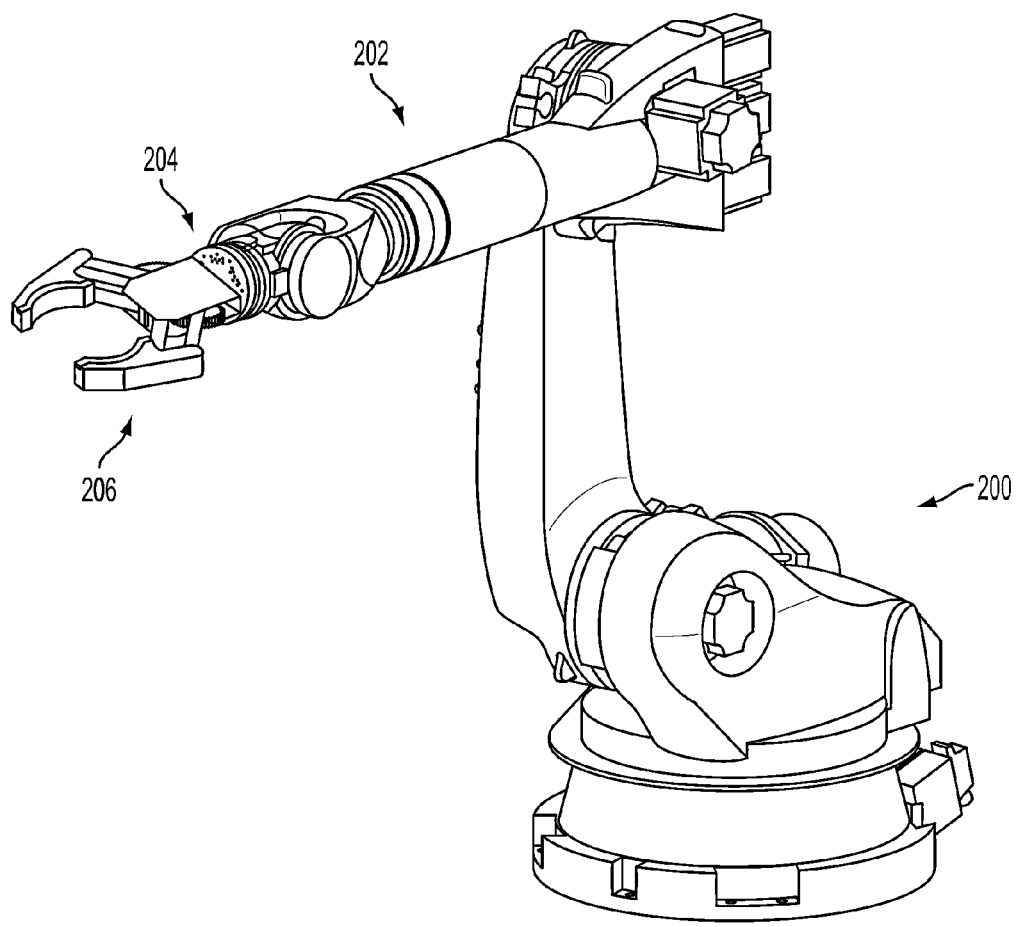
FIG. 2B shows a view of a robot with an attached gripper, according to an example embodiment.

FIG. 2B illustrates robotic device actor 200 equipped with a gripper 206. In particular, the gripper 206 may be placed at end effector 204 of the robotic arm 202. The gripper 206 may be used for various functions during a building process, such as picking up objects or parts, moving objects or parts, holding objects or parts, and/or placing objects or parts. A variety of different types of grippers may be used, such as a vacuum gripper, a tumble gripper, or a passive centering gripper. Additionally, grippers with different dimensions or other properties may be used, possibly to coincide with different types of robot actors within a physical workcell.

Figure 2C:
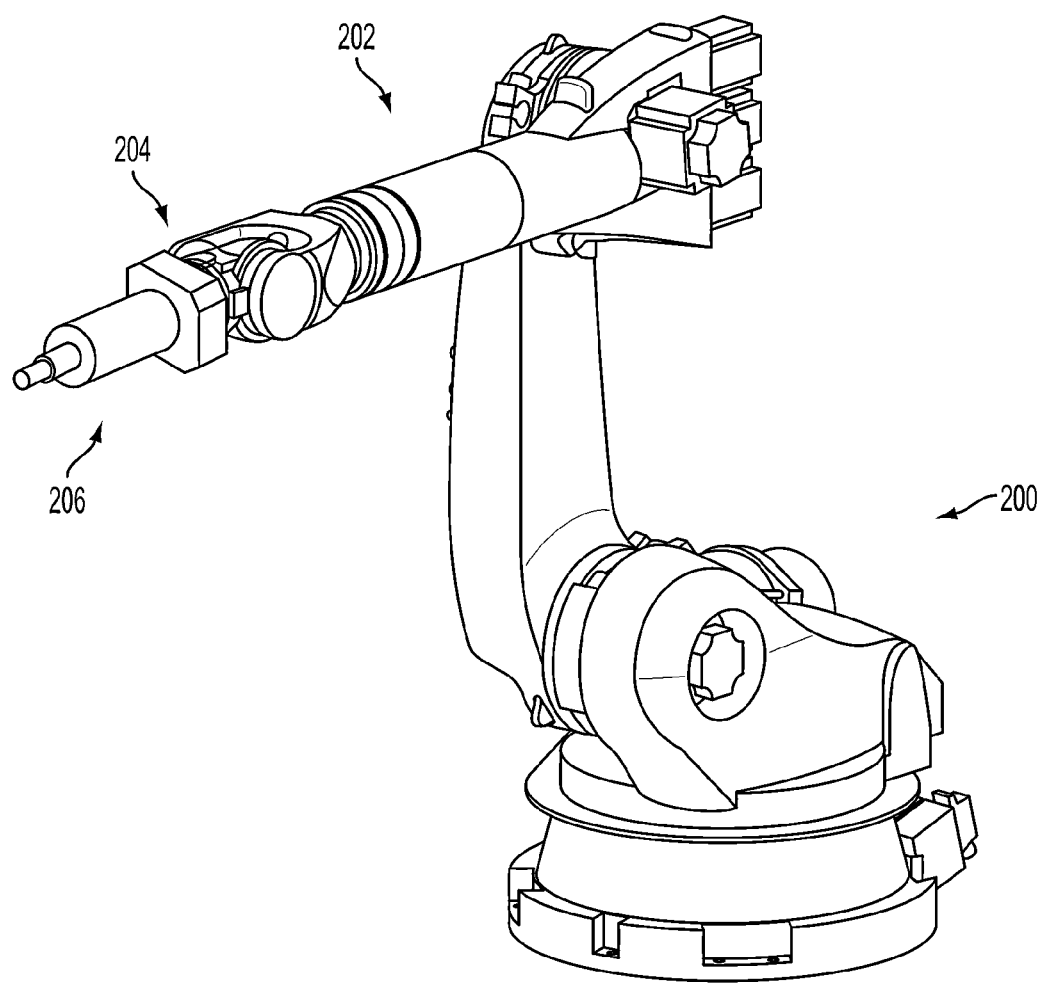
FIG. 2C shows a view of a robot with an attached spindle, according to an example embodiment.

FIG. 2C illustrates robotic device actor 200 equipped with a spindle 208. A spindle 208 may include a rotating axis for use in various functions within a building process, such as cutting materials, shaping materials, milling or routing. The spindle 208 could be a variety of different types, such as a grinding spindle, an electric spindle, a low-speed spindle, or a high-speed spindle. Additionally, spindles with different dimensions or other properties may be used, depending on the different types of robot actors within a physical workcell. In some examples, other types of tools may be used by robotic device actors as well or instead.

Figure 3A:
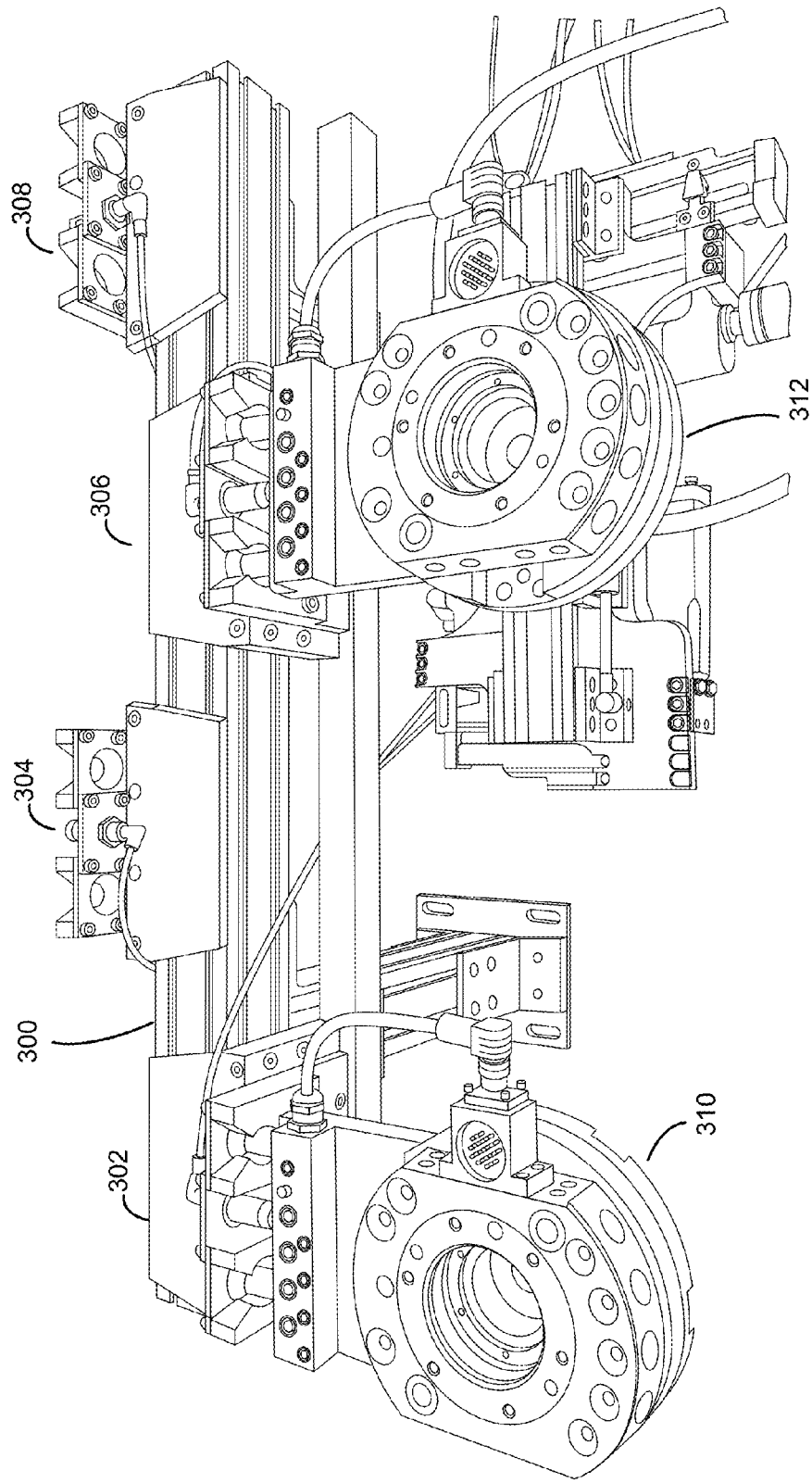
FIG. 3A shows a view of a tool rack, according to an example embodiment.

FIG. 3A illustrates a tool rack, according to an example embodiment. The tool rack may contain a number of different fabrication tools (e.g., spindles or grippers) and may be used along with an automated tool changer in order to equip robotic devices with particular tools to use within a physical workcell. In some examples, the tool rack may contain several tool rack modules 302, 304, 306, 308 positioned along a track 300, with each of the tool rack modules 302, 304, 306, 308 containing one or more particular tools. In some examples, one or more of the tool rack modules 302, 304, 306, 308 may be moveable along the track 300. In further examples, a tool rack module may be capable of interfacing with a slave module that allows for a particular tool to be selected from the tool rack module and then equipped onto a robotic device. For instance, referring to FIG. 3A, tool rack module 302 may interface with slave module 310 and tool rack module 306 may interface with slave module 312.

In order to facilitate tool changing, the tool rack modules may be equipped with built-in safety sensors to minimize the risk of accidental tool fetch and drop commands. Additionally, the tool change slave modules may include IO breakout boxes to simplify passing IO trigger signals to control tools. In some examples, the IO breakout boxes may interface with a timing control system, such as master control 10 described with respect to FIG. 1, that controls the robotic devices within a physical workcell. Master control 10 may be used to direct a tool change for a particular robotic device, which may be configured in advance using software control 26 and/or from independent manual control 28 during runtime.

Figure 3B:
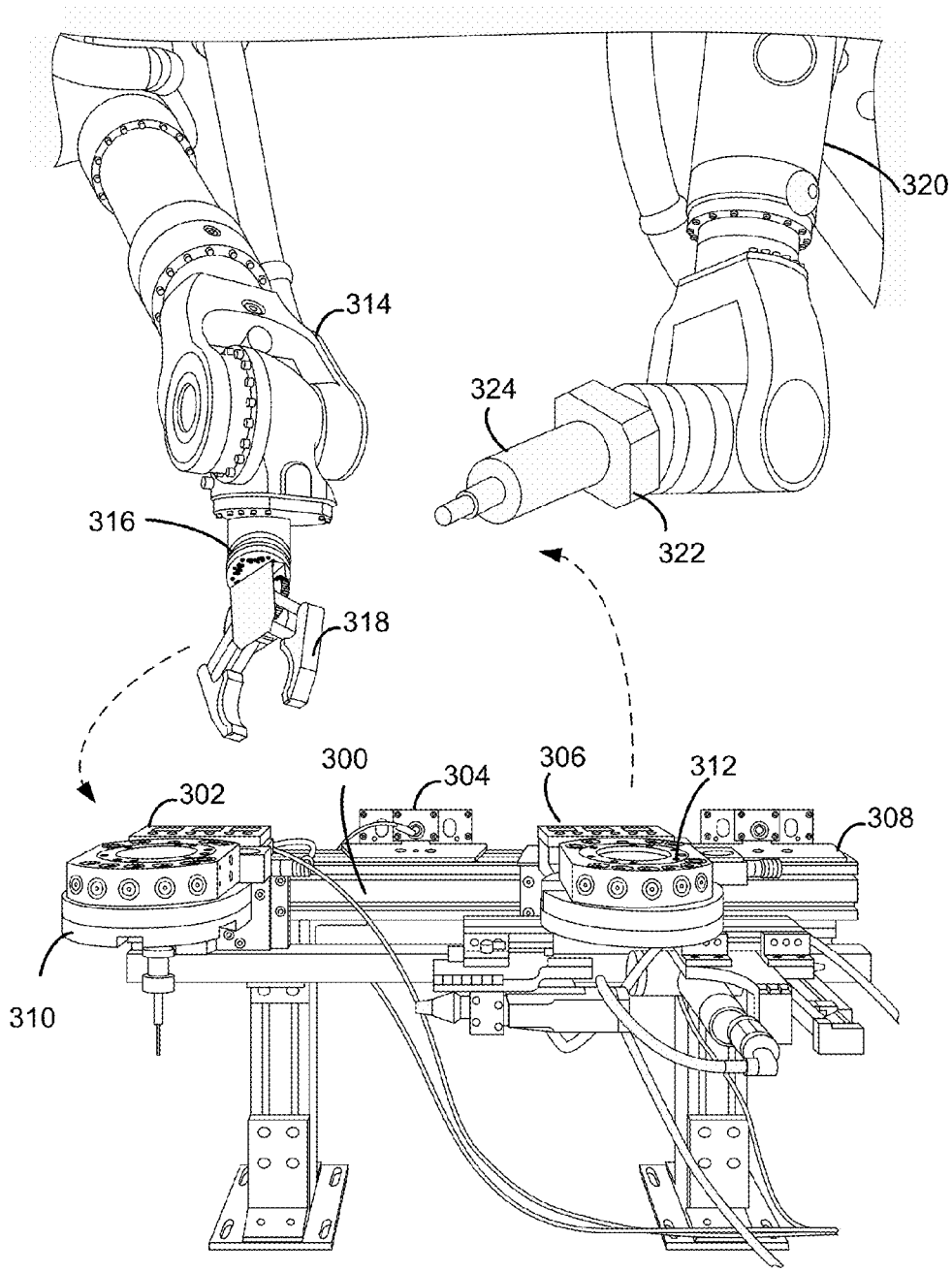
FIG. 3B shows a view of a tool rack and two robots, according to an example embodiment.

FIG. 3B illustrates use of the tool rack to equip robotic devices with tools, according to an example embodiment. In particular, a first robotic device 314 may move its end effector 316 to a position over a slave module 310 that interfaces with a tool rack module 302 of a tool rack. For instance, the robotic device 314 may currently be equipped with gripper 318, and may be controlled to move to the tool rack in order to place gripper 318 in the tool rack and equip a different tool held by tool rack module 302. Additionally, a second robotic device 320 may have positioned its end effector 322 on slave module 312 in order to equip spindle 324, which may have been held by slave module 312. After equipping spindle 324, robotic device 320 may then proceed to move away from the tool rack and complete operations using the spindle 324. The tool rack modules may be positioned on the tool rack so that multiple robotic devices may equip or change tools at the same time. In some examples, additional rack modules 304, 308 may contain additional tools that may be equipped by one or more robotic devices.

In further examples, instructions from a control system, such as master control 10 described with respect to FIG. 1, may be used in order to instruct a robotic device how to equip a tool during runtime (e.g., to determine where a tool is within the tool rack and solve an end effector problem in real time in order to position the end effector over a slave module to enable the robotic device to pick up the tool). In additional examples, a drive system (e.g., a VFD used to supply power drive a spindle) may be mounted at a separate fixed location within a physical workcell in order to supply power on the tool changer system.

IV. Example Graphical Interfaces

Figure 4A:
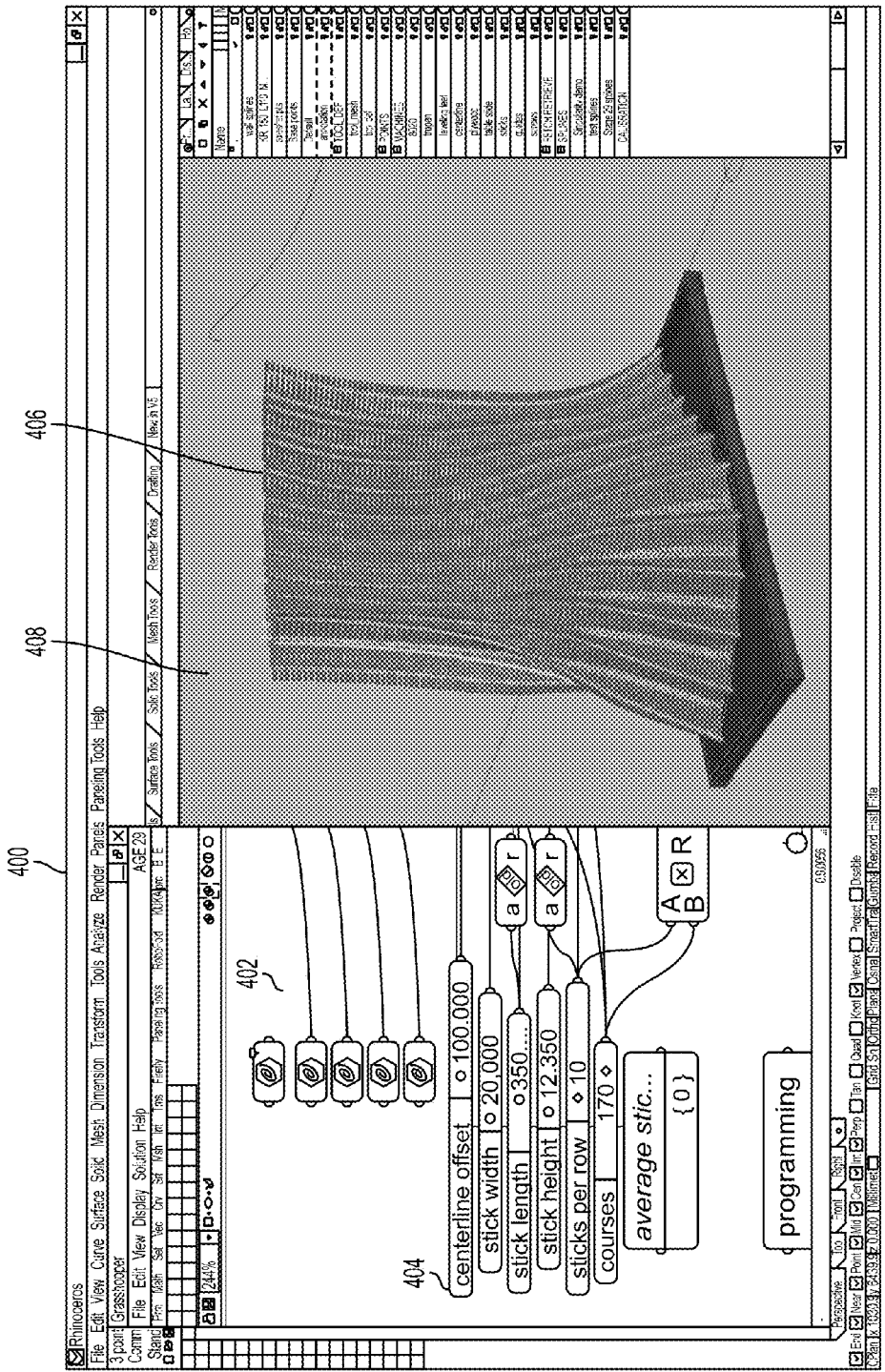
FIG. 4A shows a graphical interface with a 3D model, according to an example embodiment.

FIG. 4A shows a graphical interface containing a 3D model, according to an example embodiment. As shown, a graphical interface 400 may contain an input window 402 which may allow a user to enter parameters relating to an output product 406, such as a wall built using individual sticks. The input window 402 may allow the user to enter parameters 404 that may relate to aspects of the output product, including dimensions, density, curvature properties, other geometric properties, materials to be used, and/or other numeric inputs. The inputs may be used to derive a parametric solution for an output product 406. Additionally, the inputs may be used to generate a sketch of the output product 406 within a display window 408 of the graphical interface 400.

Figure 4B:
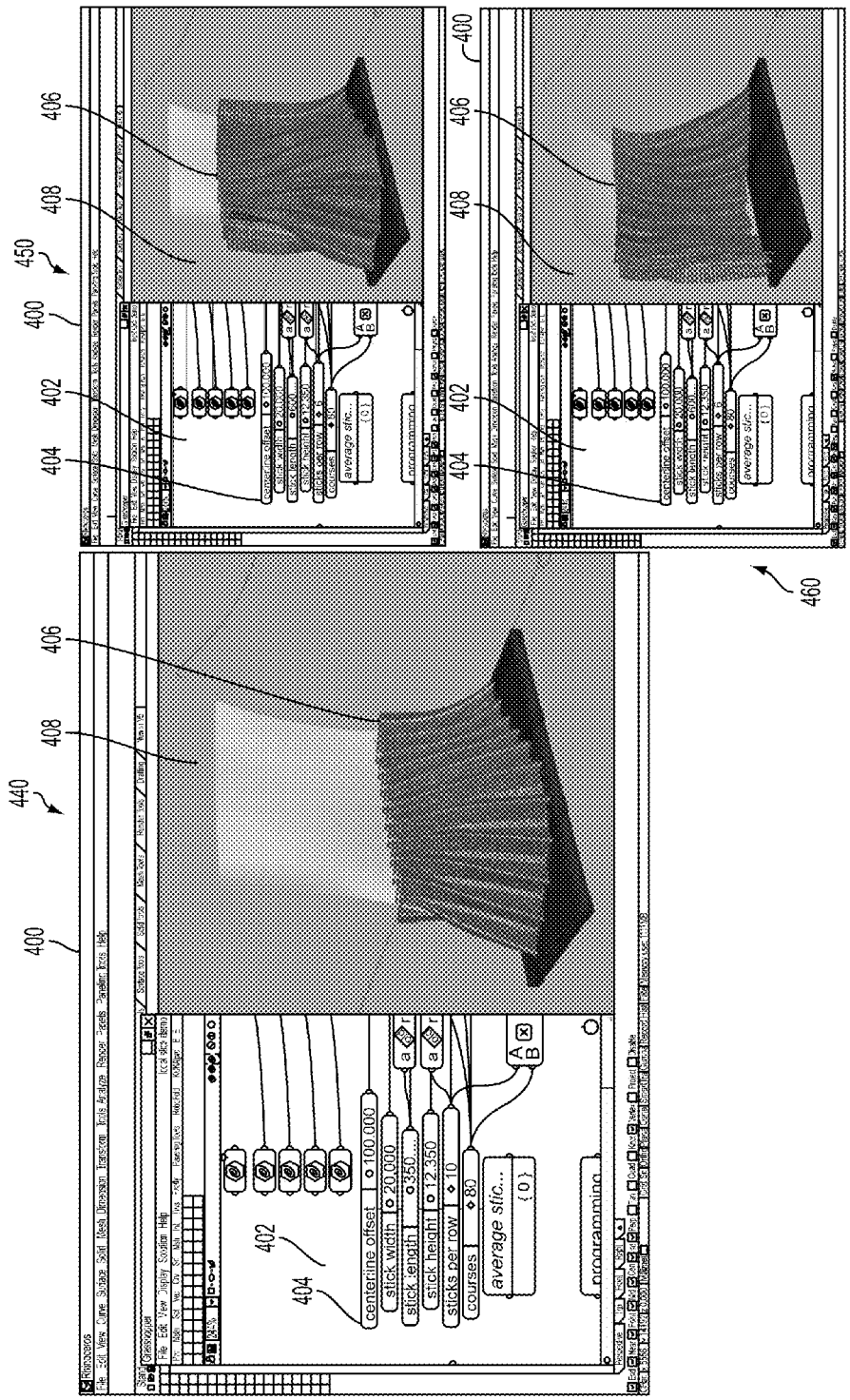
FIG. 4B shows additional graphical interfaces with 3D models, according to an example embodiment.

FIG. 4B shows three different output products based on different user input parameters, according to an example embodiment. A first view of the graphical interface 440 may contain an input window 402 and a display window 408. The input window 402 may allow a user to enter parameters 404 relating to a desired output product, including product dimensions, density, curve offsets, amount or type of curvatures, and/or other geometric or numerical inputs. Based on the input parameters 404, a geometric representation of the output product 406 may be displayed within the display window 408. In some examples, a user may modify individual parameters 404 in order to change aspects of the output product 406.

For instance, a second view of the graphical interface 450 shows a different output product 406 within the display window 408 based on different input parameters 404 within the input window 402. In this example, dimensions of the output product 406 and/or materials used to produce the output product 406 may be modified to produce an output product 406 with a greater height as shown in the second view 450. Further, a third view 460 shows another different output product 406 within the display window 408 based on different input parameters 404 within the input window 402. For example, parameters relating to the curvature of the output product may be modified by a user in order to produce another different output product 406 as shown in the third view 460.

Figure 5:
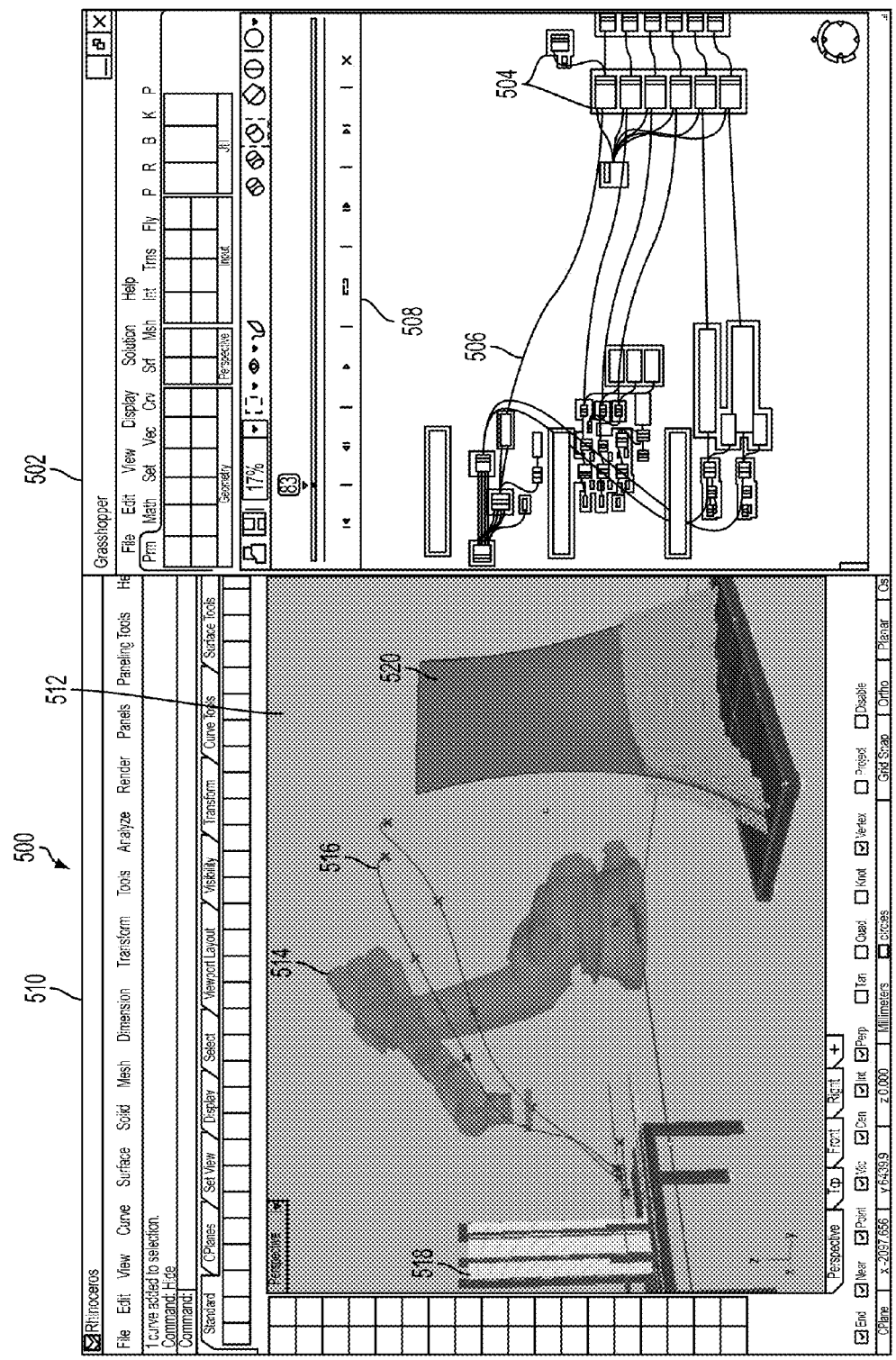
FIG. 5 illustrates a node-based graphical interface and a visualization of a building process, according to an example embodiment.

FIG. 5 shows a graphical interface for architecting a robotic building process, according to an example embodiment. For example, the graphical interface may be part of software control 26 as described above with respect to FIG. 1. As shown, a graphical interface 500 may contain an input window 502 which allows a user to control aspects of the building process, including nodes related to robot actors, tools, motion paths, and tool operations for use during construction. The graphical interface 500 may additionally contain a display window 510 which contains a 3D geometric view of the physical workcell, including components such as robot actors, tools, materials, and/or constructed output products. In example embodiments, the input window 502 may provide a visual programming interface or different type of interface that may allow a user to enter parameters describing a desired output product and/or information about the actors and tools to be used in the building process. Input data collected using the input window 502 may be used to control geometry and/or other aspects of the physical workcell displayed within the display window 510.

In one example, a user may input parameters to control a building process using an input window 502 containing a visual programming interface, such as an interface built using a visual programming language, such as a commercial software program known as Grasshopper. The interface may allow a user to include one or more nodes 504 which may represent components of the building process, such as robot nodes representing different types and/or configurations of robots, tool nodes representing different types and/or configurations of tools, IO nodes representing types of available IO, track nodes representing possible tracks of motion of robot actors, and command nodes for determining motion commands and other types of commands for robot actors.

As shown within window 502 of FIG. 5, individuals nodes 504 may be connected together using connectors 506. A connector 506 between two nodes may indicate that the output of a first node is to be used as an input to a second node. For instance, a single robot node may receive as inputs information from several different component nodes, such as nodes representing the type of robot, the type of tool used by the robot, a track the robot can travel along, and so on.

In further examples, the window 502 of FIG. 5 may contain a timeline 508. The timeline 508 may have a cursor representing a current timestamp (e.g., 83 as shown in the figure) which may represent a particular point in time of the manufacturing process. In addition, the timeline 508 may contain buttons to play through the building process at a particular speed, or fast-forward or rewind through the building process. The timeline 508 may be used to control the point in time at which the geometry and/or other aspects of the physical workcell are displayed within the display window 510. Further, the timeline 508 may be used to indicate a particular point in time either for purposes of simulating the building process or for visualizing within software an actual physical building process taking place within the physical world.

As shown in FIG. 5, the user interface may additionally contain a display window 510 which may display geometry and/or other aspects of the physical workcell based on inputs from the input window 502. For example, the display window 510 may include geometry relating to robot actors, tools, building materials, robotic motion paths, and output products, among other things. In one example, the display window 510 may be designed using a commercial 3D modeling software, such as Rhinoceros, as shown within FIG. 5. The display window 510 may display geometry within a particular physical workcell 512. The display window 510 may include options to change the perspective of the physical workcell 512 and/or to zoom in or zoom out a view of the physical workcell 512.

The physical workcell 512 may include one or more robot actors 514. The robot actors 514 may be device actors 42 and/or 44 as described above with respect to FIG. 1 and/or robotic device 200 as described with respect to FIGS. 2A-2C. Support may be provided for numerous different types of multi-axis robotic systems of different types and/or from different manufacturers. In some examples, one or more of the robot actors 514 may be traditional six-axis robots. In additional examples, other types of robots that may be configured to operate along fewer or more axes may be included for use within the physical workcell 512 in addition or instead.

In further examples, robot actors may be represented within a software interface as robot nodes, which may be put together from a number of interchangeable component nodes, including robot nodes representing different makes and models of commercial robots, tool nodes representing different types of physical tools that may be used for construction such as grippers or spindles, IO nodes representing different types IO available to communicate with a robot actor and track nodes representing different types of axes that a robot can move along. In some examples, individual tools and/or tooling parameters (such as wrist mount offsets or tool center points) can be abstracted into components that can be assembled by a user into compound tools as well.

The display window 510 may additionally contain one or more motion paths 516 representing paths of motion of individual robot actors 514. The motion paths 516 may indicate paths to be taken by the robot actors 514 during the building process, such as to pick up materials and attach them to an object under construction. In some examples, the motion paths 516 may further indicate points at which particular input or output actions will occur. For instance, an "x" on a motion path 516 may indicate a point at which a robot actor 514 uses a tool such as a gripper to pick up a particular type of material. In further examples, the motion paths 516 may be synchronized with the timeline 508 from the input window 502. Accordingly, in some examples, the robot actors 514 may be made to move along the motion paths 516 to positions at particular points in time based on the timestamp indicated by the timeline 508.

The physical workcell 512 may additionally contain one or more materials 518 to be used during the building process. In this simplified example, the materials 518 consist of sticks used to construct a wall 520. Motion paths 516 may be determined for the robot actor 514 to take in order to move the individual sticks 518 onto the wall 520. In other examples, a variety of different types of materials, including connective materials such as glue, may be used simultaneously by the robot actors to construct more complex output products.

In further examples, the physical workcell 512 may also contain other components not shown in FIG. 5 that may be used in the building process. For instance, one or more sensors may be included to sense information about the robot actors and/or materials in the physical workcell in order to influence motion paths taken by the robot actors. For example, a torque sensor may be used to determine if a particular piece of material is likely to break under stress. A control system, such as master control 10 described above with respect to FIG. 1, may be used to interface with the robot actors and/or sensors within the physical workcell.

In some examples, the display window 510 may provide users with multiple 3D views of the physical workcell, and may allow a user to change the orientation and/or zoom of a particular view. In other examples, the display window 510 may present other types of representations of the physical workcell, such as numerical representations, as well or instead.

V. Example System Workflow

Figure 6A:
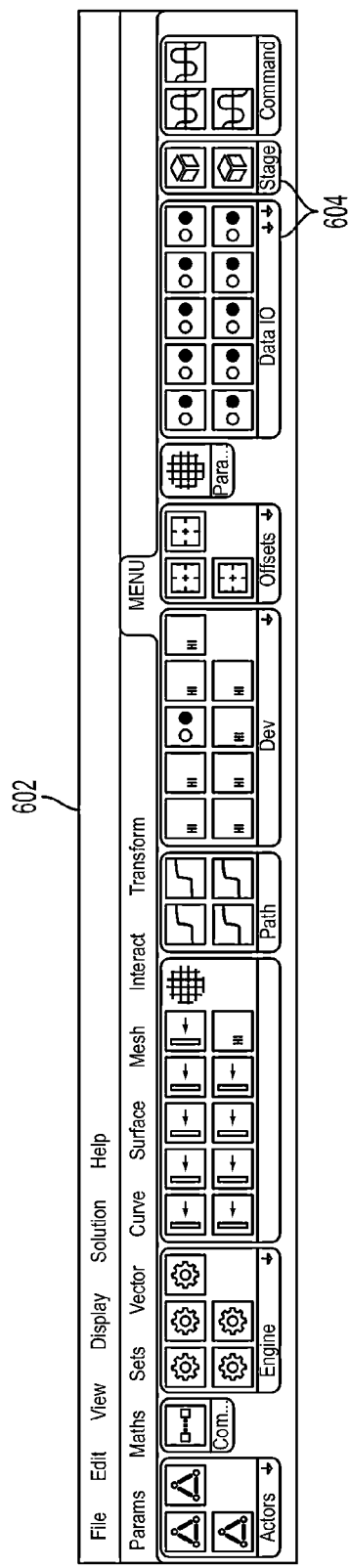
FIG. 6A illustrates a toolbar for a graphical interface, according to an example embodiment.

In some examples, an input window may additionally contain a toolbar containing digital tools to control aspects of the building process. FIG. 6A shows a toolbar for a graphical interface, according to an example embodiment. The toolbar 602 may be equipped with a variety of different toolsets 604 that may be used to design or control a building process within an input window of a graphical interface. Toolsets 604 may be provided with digital tools relating to generating robot motion paths, transforming between different planes or axes, describing robot actors, describing physical building tools, sequencing individual robot motions, communicating data input and/or output to and/or from robot actors, mapping between a virtual software environment and a physical workcell, and/or enabling visualization of a building process, for example.

Figure 6B:
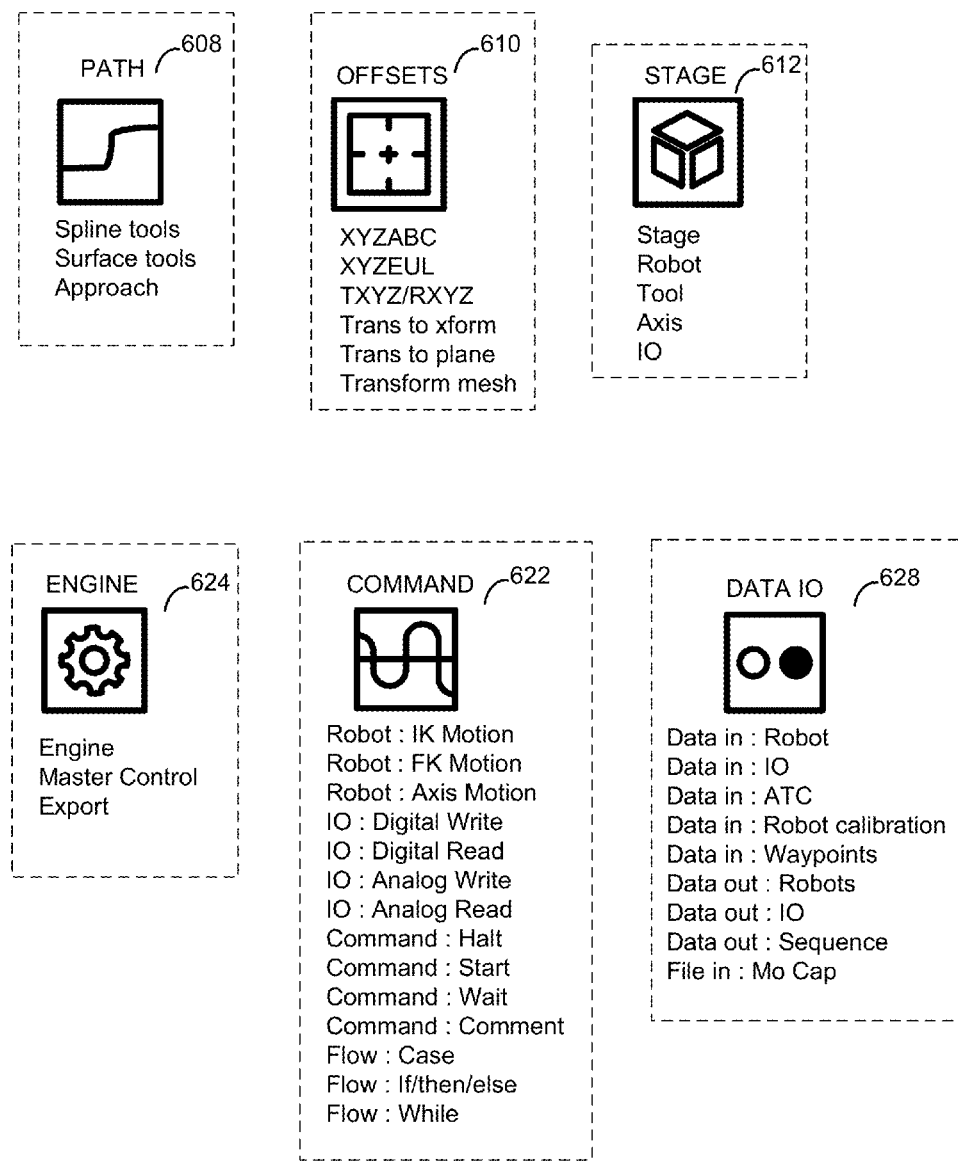
FIG. 6B illustrates an organization of digital tools, according to an example embodiment.
Figure 6C:
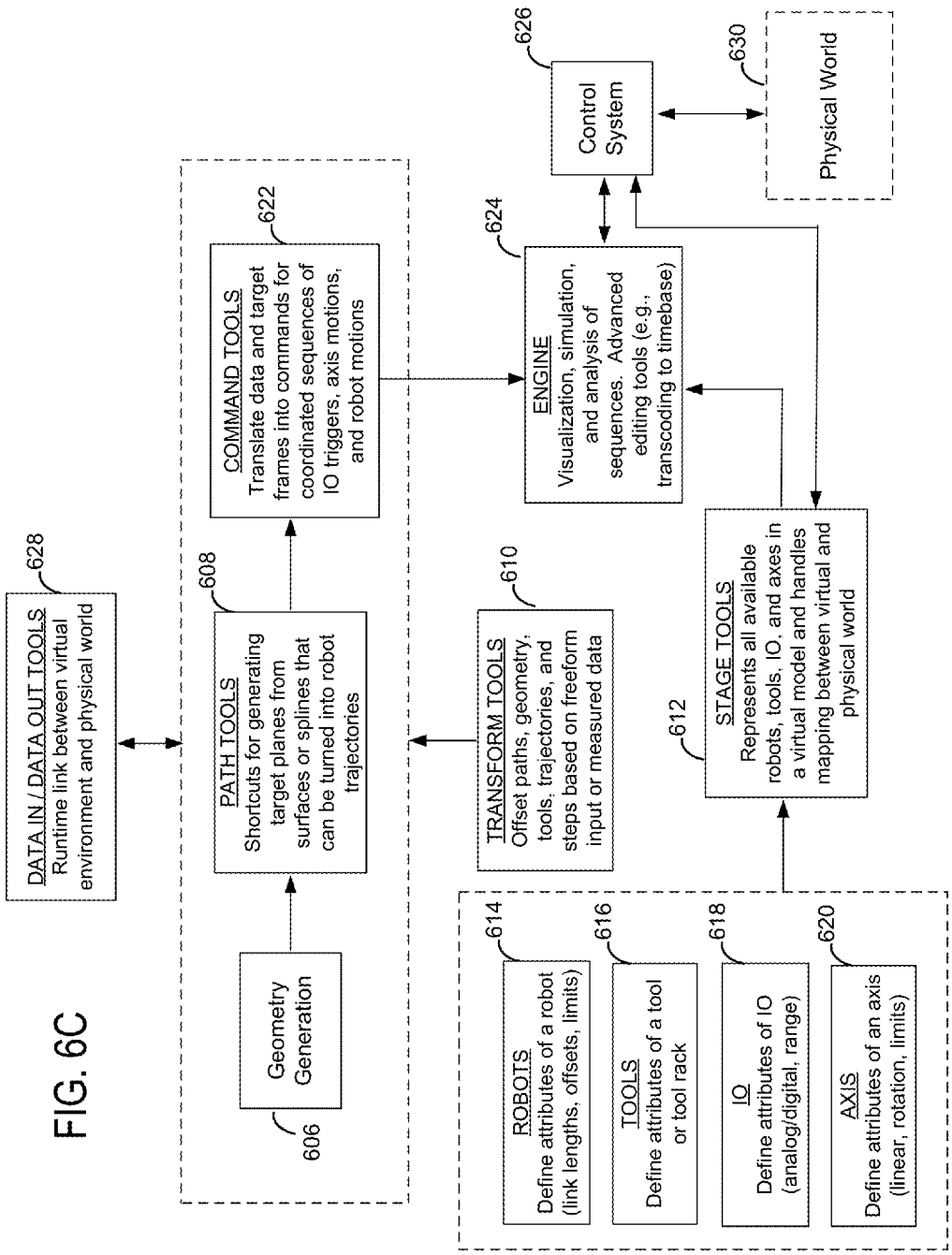
FIG. 6C is a block diagram of an example workflow, according to an example embodiment.

FIG. 6B shows an organization of digital tools within a toolbar, according to an example embodiment. As shown, the digital tools may be divided into a number of different categories. The digital tools may then be used in combination to design a building process, as shown by FIG. 6C. FIG. 6C is a block diagram of an example workflow, according to an example embodiment. In particular, FIG. 6C shows workflow involving a number of digital tools, which may be accessible within a toolbar as depicted in FIG. 6A and FIG. 6B or by another means within a graphical interface. As shown, the digital tools may be divided into a number of different categories. One or more digital tools from a number of different categories may be selected by a user to affect particular aspects of the building process, including the robot actors and other components within a physical workcell that may be used in the process.

In one example, a toolbar may include path tools 608 relating to generating target planes that may be used to determine motion paths of robot actors. In some examples, the path tools 608 may take as input geometry 606 describing a desired output product, such as geometry generated by parametric modeling software, Grasshopper. For instance, the output product geometry 606 may be generated based on user input within an input window specifying aspects of the output geometry, including dimensions, density, curvature, materials, and so on. The path tools 608 may then determine target planes fir robot motion paths based on the output product geometry 606.

In some examples, the output product geometry 606 may include particular splines, surfaces, and/or other geometrical constructions to be included within an output product. The path tools 608 may then provide shortcuts fir generating target planes relating to aspects of the output product in a format that can be turned into particular robot trajectories that may be used to construct an output product containing the target planes. Motion paths for individual robot actors may then be derived as a function of the target planes in addition to tool definitions and material properties, for example.

In further examples, a toolbar may include transform tools 610 relating to transformations between different axis frames or offsets, as shown by FIG. 6B and FIG. 6C. For instance, the transform tools 610 may provide transformations between coordinate frames at the base or joints of a particular robot and a stage containing the output product. In other examples, the transform tools 610 may additionally allow for transformations between multiple robots operating within different frames of reference as well. As shown in FIG. 6C, transformations may be applied before and/or after determining sequences of motion for individual robot actors.

In further examples, a toolbar may include stage tools 612 that represent aspects of a physical workcell, such as robot actors, tools, IO, and/or axes. In some examples, stage tools 612 may also provide a mapping between virtual robots in software and physical robot actors within the physical workcell, as shown by FIG. 6B and FIG. 6C. The stage tools 612 may be used by engine node 624 to send trajectories for robot actors to take based on output from command tools 622 to a control system 628. In some examples, stage node 612 may be configured in order to specify the currently available robotic devices and/or tools within a particular physical workcell. The control system 626 may then command robot actors and/or other components within the physical world 630 based on information from stage tools 612.

In some examples, stage tools 612 may take input from one or more robot nodes 614 representing attributes of individual robot actors within a physical workcell, as shown by FIG. 6B and FIG. 6C. A robot node 614 may be used to define attributes of a robot actor, such as traditional six-axis robots or other types of robots. The robot attributes may include link lengths of the robot and/or arm lengths of the robot, offsets of the robot and/or joints of the robot, and/or limits on robot joint movement or maximum torque that a robot joint can handle, for example.

In additional examples, stage tools 612 may also take input from one or more tool nodes 616 for defining the attributes of physical building tools and/or a tool rack for holding the tools, as shown by FIG. 6B and FIG. 6C. For example, attributes of building tools such as grippers or spindles may be specified by tool nodes, which may be used to configure an automatic tool changer so that robot actors can easily switch between tools. In some examples, robot actors may switch between tools using a tool rack which stores the tools and facilitates a tool changing process, as described above with respect to FIGS. 3A and 3B.

In further examples, the tool nodes 616 may include support for compound tooling that may allow component tools to be assembled into compound tools. In particular, individual tooling parameters (e.g., wrist mount offsets or tool center points) may be abstracted into components that may be assembled into compound tools. For instance, multiple tools may be aggregated into one compound tool that has multiple tool orientations and/or center points that may be used depending on which component of the tool may be required at a particular time. For example, a compound tool with an automatic tool changer may be represented by a master interface plus a number of different attachments, such as a spindle, a vacuum array, or a gripper. In another example, a compound tool may include a series of different tools, such as a gripper plus a tensioner plus a roller. Other examples of combining multiple tools and/or combining tools by abstracting tooling into parameters that define tool orientation and/or center points are also possible.

In further examples, stage tools 612 may also take input from one or more IO nodes 618. The IO nodes 618 may describe information relating to digital and/or analog input and/or output actions that may be taken by a robot actor, such as the type of action (e.g., gripping a material) and attributes associated with the action (e.g., width of material that can be gripped). In additional examples, the robot attributes may include one or more axis nodes 620. The axis nodes 620 may describe one or more linear and/or rotational axes along which a robot can travel including limitations on the robot's movements along the axes.

In additional examples, a toolbar may include command tools 622, as shown by FIGS. 6B and 6C. The command tools 622 may be used to determine robot commands to cause one or more of the robot actors to execute particular operations, which may include point-to-point motions, motions along external axes, and/or input or output events. For example, one of command tools 622 may be used to direct a particular robot motion along one of six degrees of freedom, a particular robot motion along an external axis, or a particular input or output event, such as applying glue to a material in a particular manner. Additionally, command tools 622 may be included for creating step nodes that instruct robot actors to take a particular sequence motion steps and carry out one or more tool actions. In further examples, coordinated sequences of motions may be generated fir multiple robot actors working together within a single timeframe.

In some examples, step nodes, or sequences of motions and actions, can be abstracted into reusable subroutines. For instance, a subroutine can be defined by connecting visual building blocks, which may represent particular motion commands or motion parameters. The subroutine could then be used to make one or more robots carry out the same action sequence multiple times within a single building process. In some examples, steps can be synchronized across multiple robots so that multiple robots can work in a shared environment simultaneously. Example systems may also include an engine node 624, which may assign each of the steps to particular robotic devices within a stage.

In further examples, users may be provided with functionality to switch between steps within the graphical interface. For instance, timeline 508 as illustrated and described with respect to FIG. 5 may also includes buttons to skip between steps on the timeline. In some examples, digital bookmarks may be inserted by a user for particular steps. For instance, through the graphical interface, it may be possible to jump from the beginning of a "fetch stick" step to the beginning of a "nail stick" step. These bookmarks steps within the timeline may match the steps authored by the user by inputting motion commands, IO commands, and/or other commands in a step node.

Additionally, the engine node 624 may communicate with control system 626. The control system 626 may be a computing device capable of communicating wirelessly with robot actors and/or other components such as sensors within the physical workcell in the physical world 630. In particular, the control system 626 may provide access to real time data streams from all robot actors and devices, which may allow for precise control over the physical workcell at particular points in time. The control system could communicate with some or all of the actors or devices through wired connections or other types of communication channels as well or instead, including previously described network protocols.

In some examples, the control system may additionally contain a physical control interface such as a touchscreen interface that may allow a user to interact with the control system to view live data or modify robot actions in real time. For instance, a stage file containing information about the physical workcell including actors, tools, materials, and environmental setup on the control system 626 may be accessible via a programming interface. A user who is watching a building process within the physical world 630 may then make modifications to the process before it is completed.

In additional examples, a toolbar may include data input/output tools 628 that may allow the control system 626 to send and/or receive data to and/or from the virtual software environment that determines robot motion paths, as shown by FIG. 6B and FIG. 6C. Accordingly, telemetry from the control system 626 may be used to create a live link between the virtual world in software and the physical world 630. For instance, the data input/output tools 628 may be used to process information from the control system 626 relating to the robot actors within the physical workcell and/or other components in the workcell such as sensors. Based on this information about the physical world 630, the virtual robots within software may be updated with real-time feedback from the physical world 630 (e.g., motion paths for robot actors may be determined or modified based on real-time sensor data). Additionally, the data input/output tools 628 may be used to send data back to the control system 626 so that the control system 626 can effectuate particular input or output actions within the physical world 630, for example. For instance, the control system 626 may instruct a robot actor how use a tool in the physical world 630 (e.g., how to control a spindle) based on information from one or more digital tools within the software interface.

In further examples, engine node 624 include visualizer or simulation tools that may allow a user to simulate a building process through a user interface in software, as shown by FIG. 6B and FIG. 6C. In some examples, the visualizer tools may display the building process as geometry drawn on a screen that shows the physical workcell. In other examples, the visualizer tools may display the building process as curves representing particular data values as well or instead. Additionally, in further examples, the visualizer tools may also be used to visualize a building process in software as it is actually occurring within the physical world 630. In some examples, the visualizer tools may additionally provide a graphical representation of potential conflicts within a particular building process, such as when a robot's motion path extends outside its possible range of motion or when two robot actors may be going to collide based on the currently defined trajectories and/or step sequences.

In further examples, the visualizer component may allow a user to see simulations of the building process in advance and/or as the building takes place. In some examples, the user may use the visualizer component offline to see robotic motion paths as well as input/output events over a series of sequential steps as geometry drawn within a viewing window. In other examples, the user may be able to visualize a simulated playback as numerical data streams relating to the robot actors, materials, and/or other aspects of the physical workcell represented through curves in addition to or instead of visual geometry. In further examples, the user may also be able to see particular data points at individual timesteps, such as robotic joint values, axis values, or input/output values.

In some example systems, a user may also be able to use the visualizer component to visualize a building process that is occurring in the physical world in real time. The system may interface with a control system that receives real-time data streams from sensors that may be used to scan the physical workcell, individual robot actors, and/or parts used in construction as an output product is being built. Accordingly, the visualizer's user interfaces may be updated in real time to reflect real world dimensions, properties, and/or positions of objects and actors within the environment.

VI. Example Methods

A method 700 is provided for enabling runtime control of one or more robot actors used for a building process, according to an example embodiment. In some examples, method 700 may be carried out by a control system, such as manufacture control system 100, master control 10, and/or software control 26 as described in reference to FIG. 1. Additionally, the control system may send data to and/or receive data from a separate control device, such as independent manual control 28. In further examples, part or all of method 700 may be executed by independent manual control 28 itself. The control system may also communicate with the robot actors using any of the network protocols or communication methods previously described. In additional examples, part or all of method 700 may be executed by any of the graphical interfaces or systems described and illustrated with respect to FIGS. 4A-4B, 5, and 6A-6C. In further examples, part or all of method 700 may be carried out by one or more robotic devices, such as device actors 42, 44 within system devices 40 as described in reference to FIG. 1, or device actor 200 as illustrated and described in reference to FIGS. 2A-2C. Additionally, while examples with certain numbers and types of system devices may be described, various alternative embodiments may include any number and type of robotic devices as well.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 7. Where used, program code can be stored on any type of computer-readable medium, for example, such as a storage device including a disk or hard drive.

Figure 7:
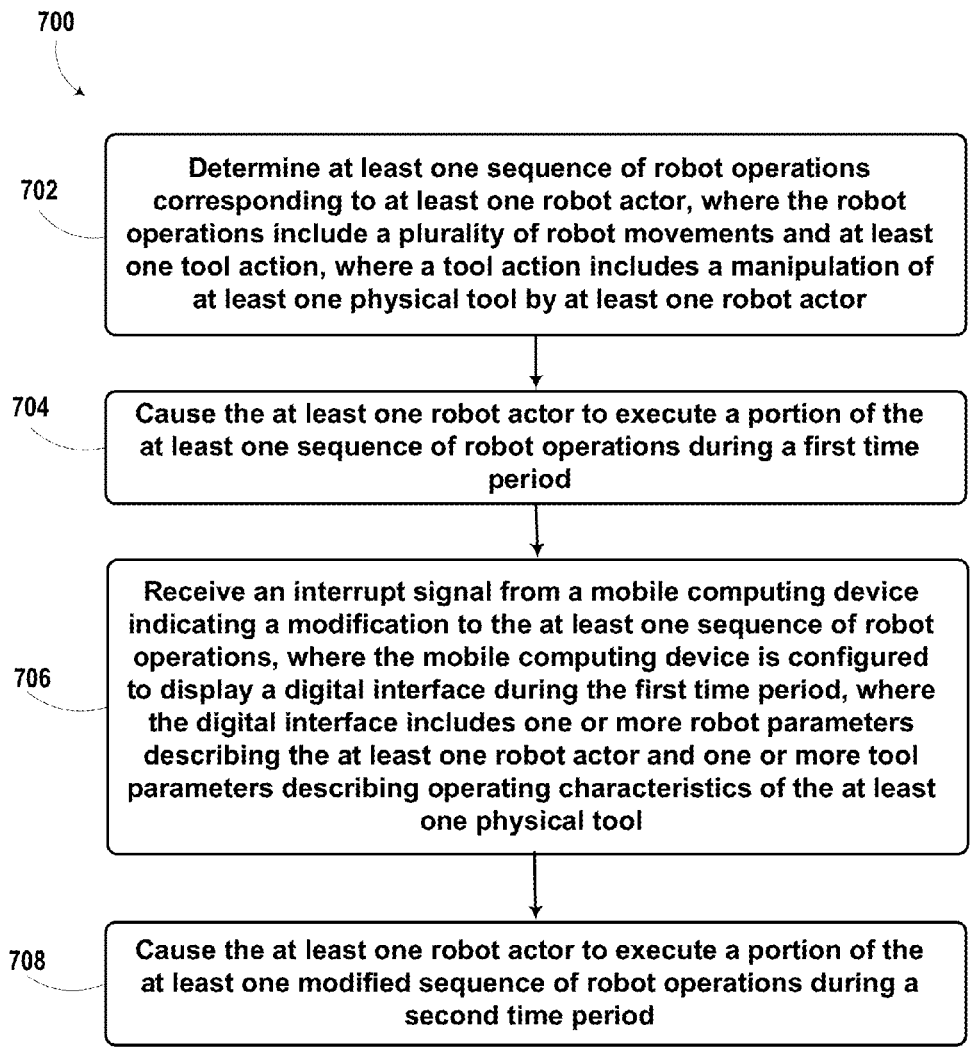
FIG. 7 is a block diagram of an example method, according to an example embodiment.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702 of FIG. 7, method 700 may include determining at least one sequence of robot operations to be performed by one or more robot actors. In particular, the robot operations may include robot movements as well as tool actions using physical tools for construction, such as to fabricate an output product. The robot actors and physical tools could include any of the types of hardware devices previously described. In some examples, the sequence of robot operations may be determined using a software authoring environment, such as described previously with respect to FIGS. 4A-4B, 5, and 6A-6C. In other examples, the sequence of robot operations may be determined in advance and stored in a memory storage for later execution.

As shown by block 704 of FIG. 7, method 700 may further include causing the one or more robot actors to execute a portion of the robot operations during a first time period. In particular, a control system, such as master control 10 described with respect to FIG. 1, may transmit instructions to robot actors in order to cause the robot actors to move within a physical workcell and execute tool actions using physical tools. In some examples, the instructions may be transmitted in order to cause robot actors to execute robot operations within a particular sequential order. In other examples, the instructions may be transmitted in order to cause robot actors to execute robot operations at particular points in time, such as at points in time along a global timeline corresponding to an entire building process.

As shown by block 706 of FIG. 7, method 700 may additionally include receiving an interrupt signal from a mobile computing device. The interrupt signal may indicate one or more modifications to the sequences of robot operations being executed by the robot actors. The mobile computing device could be any computing device capable of displaying a digital interface, receiving user input, and transmitting signals (e.g., to a control system). In some examples, the mobile computing device could contain a touch-based interface that allows for touch input. For instance, the mobile computing device could be a tablet device or a mobile phone. In further examples, the computing device may receive user input from a keyboard, a pointing device, or a different type of input mechanism as well or instead. In additional examples, the mobile computing device may or may not be in motion during part or all of the execution of method 700. In some examples, the mobile computing device could also be a laptop computer or a desktop computer.

In further examples, the computing device may display a digital interface during the first time period while the robot actors are executing robot operations within a building process. The digital interface may include parameters describing aspects of the building process during runtime. In particular, robot parameters may be displayed that describe characteristics of the robot actors, such as the position of robot actors, physical tools currently being used by the robot actors, and/or axes along which the robot actors are currently operating within a physical workcell Additionally, tool parameters may be displayed describing operating characteristics of the physical tools. For instance, an amount of power being supplied to a spindle or an amount of force being used with a gripper could be displayed within an example digital interface.

FIG. 8A-8E collectively show views of a digital interface, according to an example embodiment. In some examples, a digital interface may contain multiple submenus relating to different aspects of a building process. For example, a control submenu 802 may contain controls related to ordering and/or speed of execution of robot operations. Additionally, an IO submenu 804 may contain controls relating to digital or analog IO, including operating characteristics of physical tools controlled by the robot actors. Further, a robot submenu 806 may contain controls relating to the robot actors, such as robot positions and diagnostics. Also, a tool changer submenu 808 may contain controls related to causing robot actors to change tools within a physical workcell. Additionally, a megadriver submenu 810 may allow for control of different attributes of multiple robot actors simultaneously. In other examples, different combinations or types of submenus may be used. In some examples, all of the controls may instead be contained within a single menu within the digital interface.

Figure 8A:
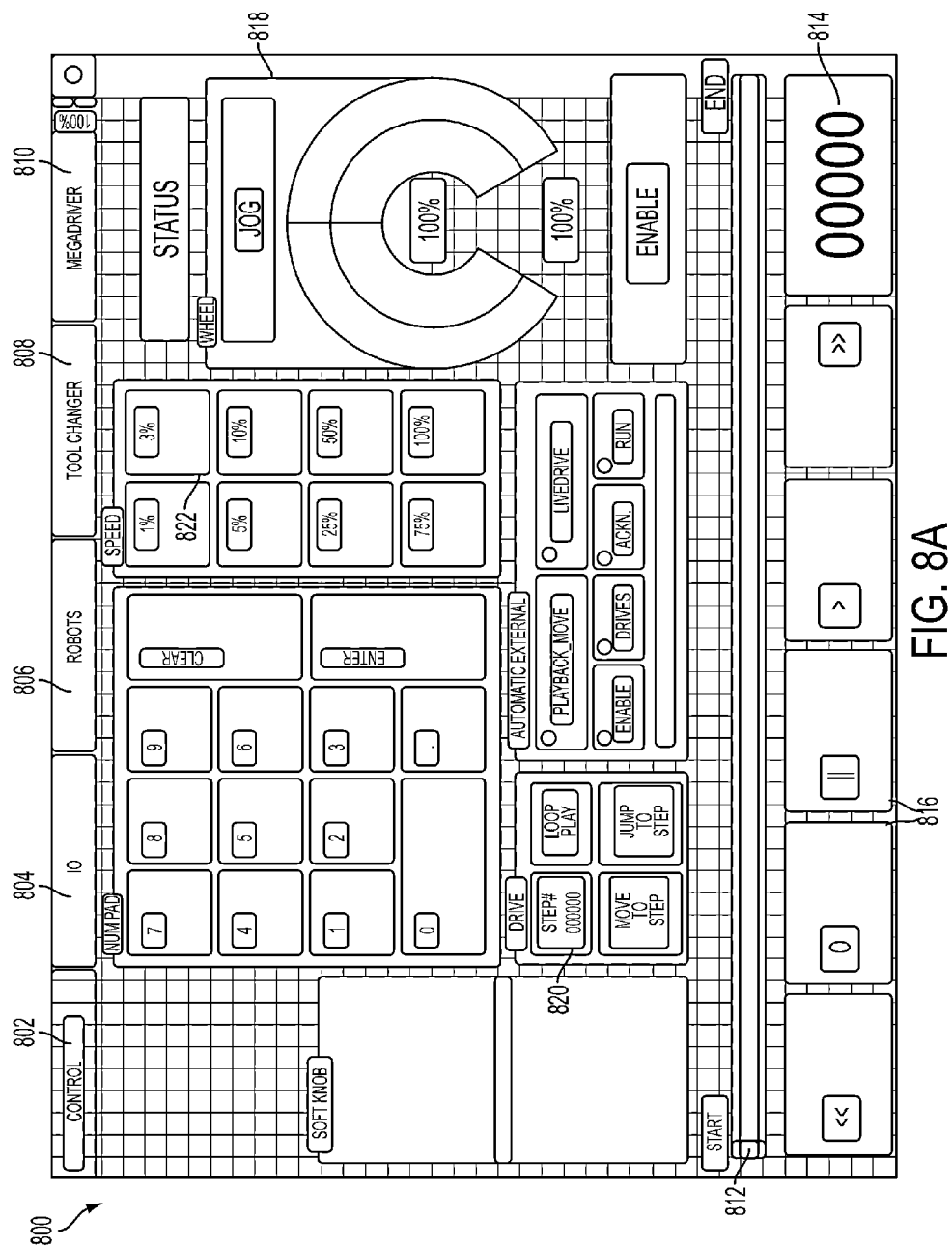
FIG. 8A illustrates a view of a digital interface, according to an example embodiment.

FIG. 8A shows one view of digital interface 800, according to an example embodiment. In particular, control submenu 802 may be selected within digital interface 800. Within the control submenu 802, controls may be provided for manipulating one or more sequences of robot operations being executed during runtime. For example, a user may be able to interact with the digital interface using touch input in order to modify a building process by altering planned robot operations by the robot actors in real time or almost real time.

In some examples, the digital interface may also contain a digital timeline 812. The digital timeline 812 may contain a digital marker that indicates a current position within one or more sequences of robot operations being executed by corresponding robot actors. In further examples, the current position may be indicated by a step number 814, which may contain a numeric value representing how many steps within the sequences of robot operations have been executed. In other examples, the robot operations may be caused to occur at particular points in time, in which case the digital timeline 812 may represent particular timestamps during a building process instead. In other examples, both a step number and a timestamp could be displayed within a single interface.

In further examples, a digital interface may contain one or more controls 816 in order to change a position or rate of execution of operations within the digital timeline 812. For example, one of the controls 816 may be a fast-forward option that causes robot actors to increase the rate at which they are executing robot operations. Additionally, another one of the controls 816 may be a pause button which stops execution of a building process. For instance, activation of the pause button may cause the mobile device to send a signal to stop execution of the building process, and later a separate signal to restart operation when the play button is activated.

In additional examples, one of the controls 816 may include a rewind command that may reverse a portion of a building process. For example, robot movements may be determined that cause robot actors to move in reverse to backtrack through previous motion steps. In further examples, a rewind command may also cause robot actors to execute tool actions in order to reverse certain previously executed tool actions. For example, when operating in reverse, a robot actor may pry out a nail that the robot actor previously drove into a wooden board. Other examples of reverse robot operations and/or tool actions are also possible.

In further examples, the digital interface may additionally contain a digital wheel 818. The digital wheel 818 may be used to affect the current rate of execution of robot operations by the robot actors. For example, the digital wheel 818 may contain a digital marker indicating a current rate of execution. By moving the digital marker around the digital wheel 818 (e.g., with a finger), a user may be able to control or adjust the rate of execution during runtime. In additional examples, the digital wheel 818 may be configured so that if the user stops sending touch input (e.g., by removing a finger from the digital interface), the digital marker returns to a particular central position indicating a particular rate of execution of robot operations. In other examples, multiple digital wheels may be provided within a digital interface in order to control rates of execution of individual robot actors separately. For example, a user may control a robot actor which is performing routine operations to operate quickly until the robot actor reaches a more delicate procedure (e.g., a critical welding procedure), at which point the rate of execution may be slowed down for visual confirmation by the user.

In additional examples, the digital interface may include step controls 820. In some examples, the step controls 820 may allow a user to cause robot actors to jump to other points within sequences of robot operations. For example, step controls 820 may be used to cause one or more robot actors to skip several steps within a building process. In other examples, step controls 820 may be used to jump backwards one or more steps in order to cause robot actors to repeat particular robot operations. For instance, a user may see that a particular robot operation (e.g., placing a stick on a wall) failed to be executed correctly (e.g., a robot actor failed to pick up the stick). In such a circumstance, the user may be able to use the runtime controller to cause the robot actor to repeat the failed operations (e.g., to cause the robot actor to pick up the stick again).

In further examples, the digital interface may include speed controls 822. The speed controls 822 may be used to change the rate of execution of particular robot actors and/or of all the robot actors within a building process. For example, speed controls 822 may contain multipliers (e.g., 5%, 25%, 50%) in order to change rates of execution of robot operations by the robot actors. For instance, a multiplier of 50% may cause robot operations to be executed at half the speed. Other methods of controlling playback speed may be included with speed controls 822 as well or instead.

Figure 8B:
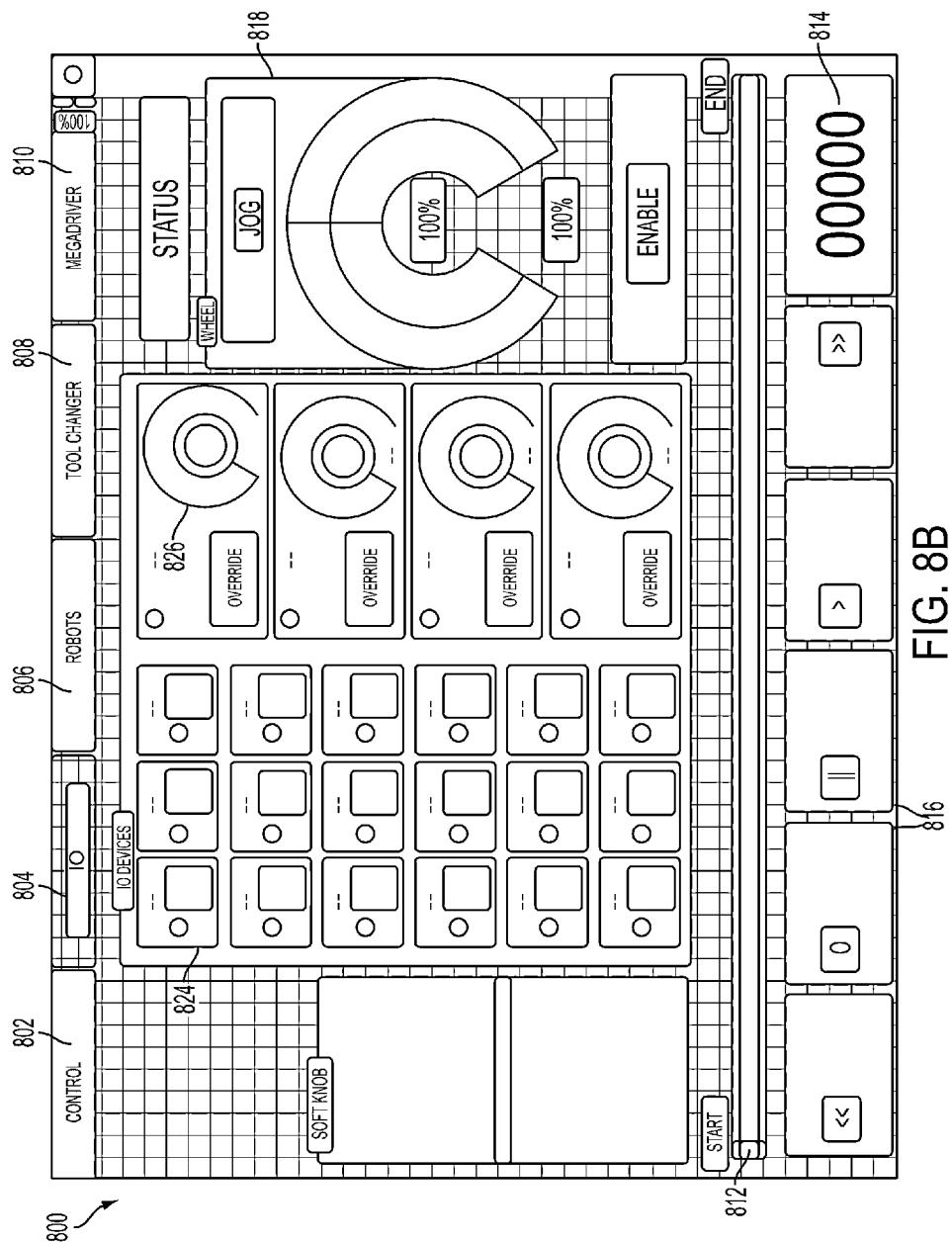
FIG. 8B illustrates another view of a digital interface, according to an example embodiment.

FIG. 8B shows a further view of digital interface 800, according to an example embodiment. In particular, IO submenu 804 may be selected within digital interface 800. Within the IO submenu 804, controls may be provided for changing parameters associated with digital or analog input or output, including parameters controlling aspects of tool operation. In some examples, an IO parameter or tool parameter may be overridden using the digital interface (e.g., by touching a particular parameter and then entering a different number using a virtual keyboard or a different input mechanism). An interrupt signal may then be sent in order to cause one or more of the robot actors to modify operation by applying the overridden parameter.

In some examples, the digital interface may include a listing of IO devices 824 within a physical workcell. For instance, an IO device may be a VFD used to drive a physical tool such as a spindle. A separate override control 826 may be provided within the digital interface in order to adjust an IO parameter, such as the amount of power supplied to a corresponding IO device or tool. In some examples, the override control 826 may contain a digital wheel, which may be used to adjust a particular IO parameter. For example, by moving a digital marker within the digital wheel, the IO parameter may be decreased or increased within the digital interface. Based on the changed numerical value, an interrupt signal may be sent in order to change the IO parameter used by a robot actor within the physical workcell.

In further examples, additional aspects of tool operation may be modified within the digital interface. For example, a rate of speed of operation of a particular tool identified within IO devices 824 may be modified using an override control 826. For instance, the frequency of a spindle may be controlled from within the digital interface. Accordingly, a user may use a mobile computing device to change a pre-programmed frequency of tool operation (e.g., by doubling the frequency or halving the frequency) during runtime based on visual feedback from seeing the tool's operation. In further examples, other IO parameters may be modified within the digital interface as well or instead, such as an amount of force applied during a tool action or an amount of time to complete a particular tool action.

Figure 8C:
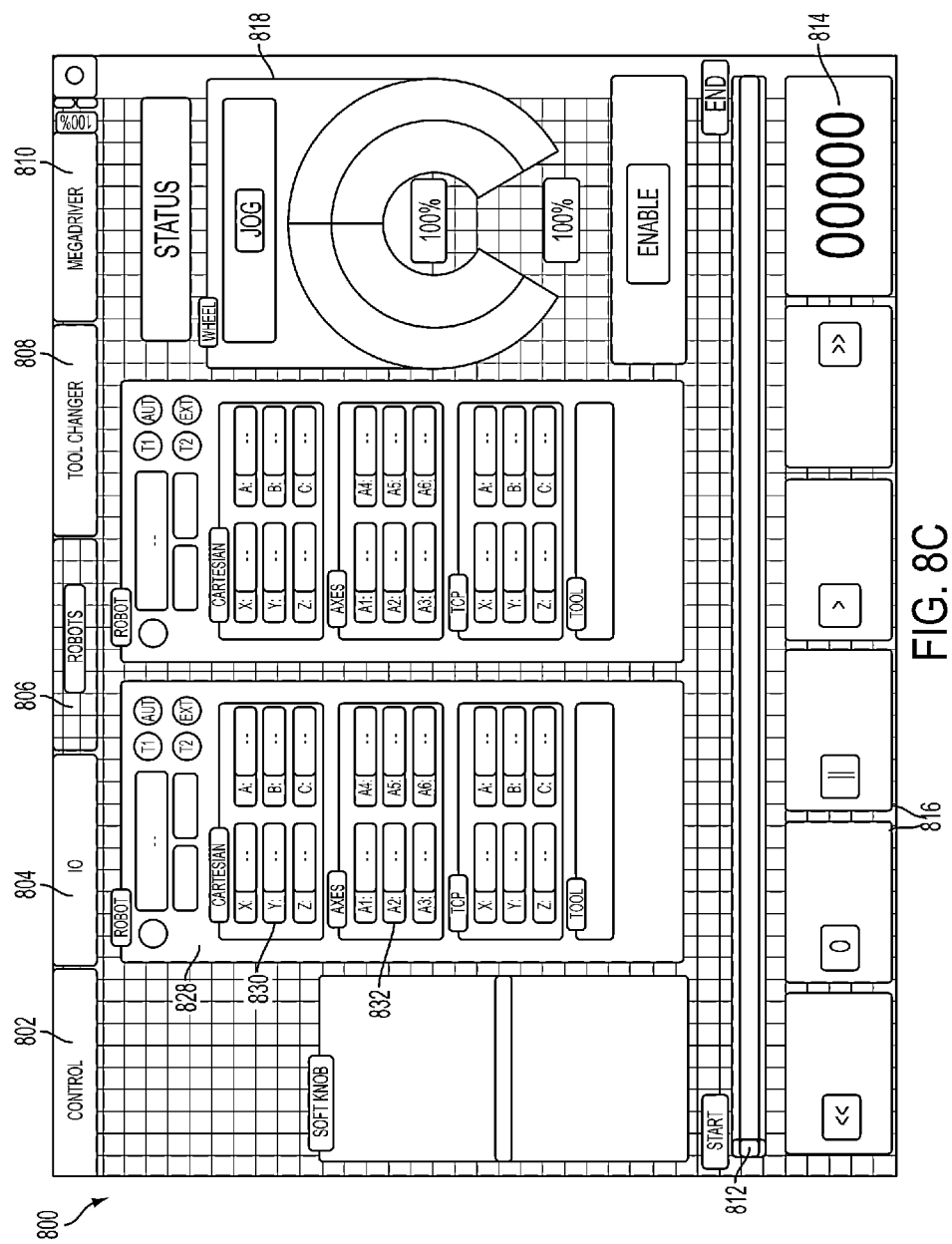
FIG. 8C illustrates yet another view of a digital interface, according to an example embodiment.

FIG. 8C shows an additional view of digital interface 800, according to an example embodiment. In particular, robot submenu 806 may be selected within digital interface 800. Within the robot submenu 806, controls may be provided for changing parameters associated with robot actors within a physical workcell. In particular, changing a parameter within the digital interface may trigger an interrupt signal, which may change the robot parameter for a corresponding robot actor during execution of a sequence of robot operations within a manufacturing process.

In some examples, a digital interface may include a robot control 828 in order to select a particular robot actor within a physical workcell. For example, robot control 828 may contain a drop down menu or other interface that displays the robot actors within the physical workcell and allows for a selection of a particular robot actor. Additionally, the digital interface may include robot parameters, such as position information describing the current position of robot actors. In some examples, the position could be displayed as Cartesian coordinates 830, as robot axes values 832, or both. In further examples, the position information may reflect the position of an end effector of a robot actor or of a physical tool mounted on the robot's end effector.

In further examples, one or more robot parameters may be overridden by a user within the digital interface. For instance, using touch input, a particular Cartesian coordinate 830 or robot axis value 832 may be changed, triggering an interrupt signal which causes the robot actor to change position to the new overridden position value. In other examples, different robot parameters may be displayed and/or overridden within the digital interface as well or instead.

For instance, tool center points or offsets may be displayed and overridden to allow a user to adjust system calibration (e.g., to better calibrate a particular physical tool) during runtime.

Figure 8D:
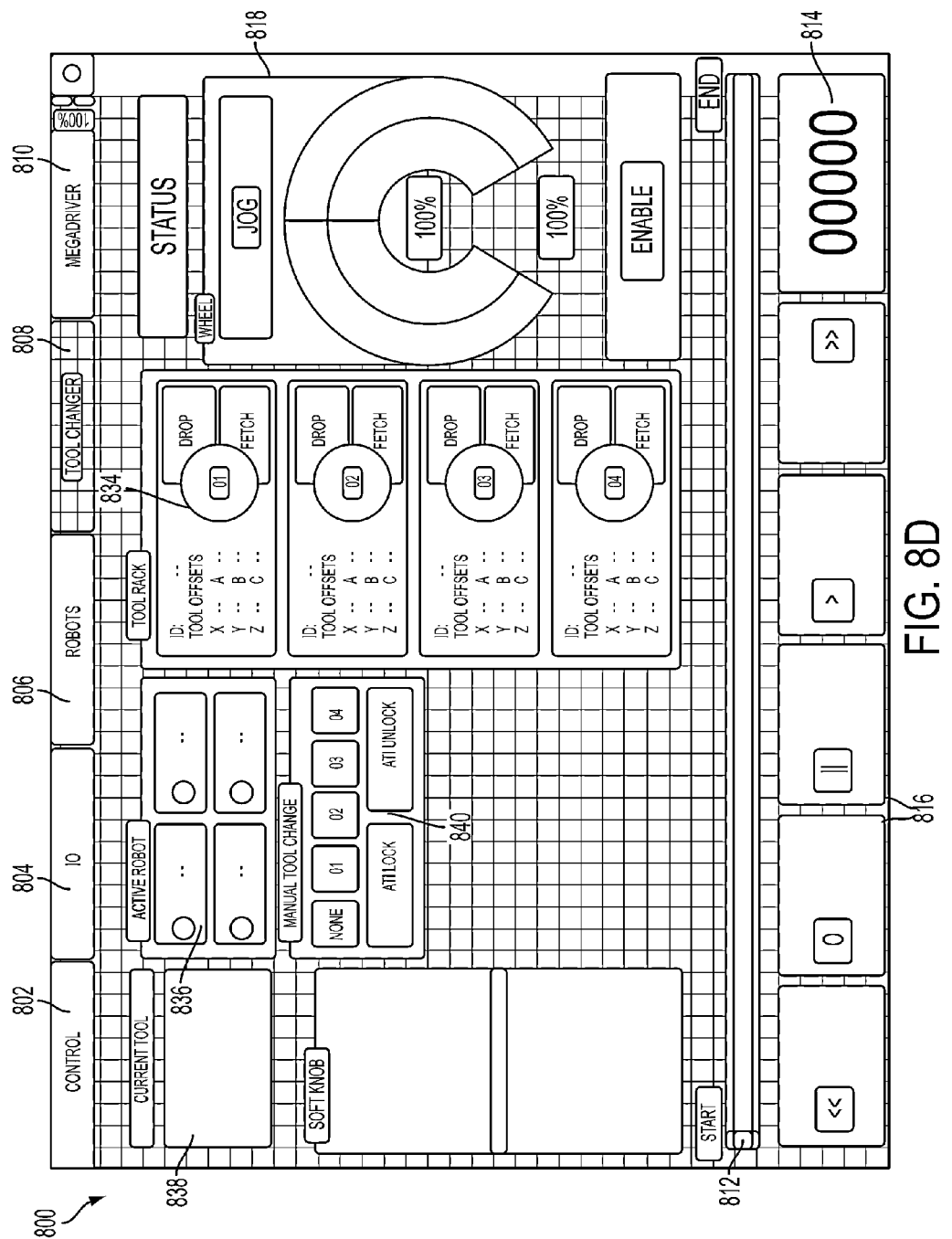
FIG. 8D illustrates a further view of a digital interface, according to an example embodiment.

FIG. 8D shows another view of digital interface 800, according to an example embodiment. In particular, tool changer submenu 808 may be selected within digital interface 800. Within the tool changer submenu 808, controls may be provided for causing robot actors to change tools within a physical workcell. For example, a mobile computing device may be used to control tool changes using a tool rack and automated tool changer, such as illustrated and described previously with respect to FIGS. 3A and 3B.

In some examples, the digital interface may include an active robot control 836. The active robot control 836 may be used in order to select a particular robot actor within a physical workcell. For example, a user may be able to select a particular robot actor in order to cause the robot actor to change tools or equip a particular tool. In further examples, the digital interface may display a current tool 838 indicating a current tool equipped by the selected robot actor. The digital interface may additionally include a tool rack control 834, which may display available physical tools within a tool rack, as well as position offsets associated with particular tools in the tool rack. A user may select a particular tool from within the tool rack control 834 and then command a tool change for the selected robot actor using manual tool change 840. In further examples, additional parameters describing the tool rack or particular construction tools may be displayed within a digital interface as well or instead.

Figure 8E:
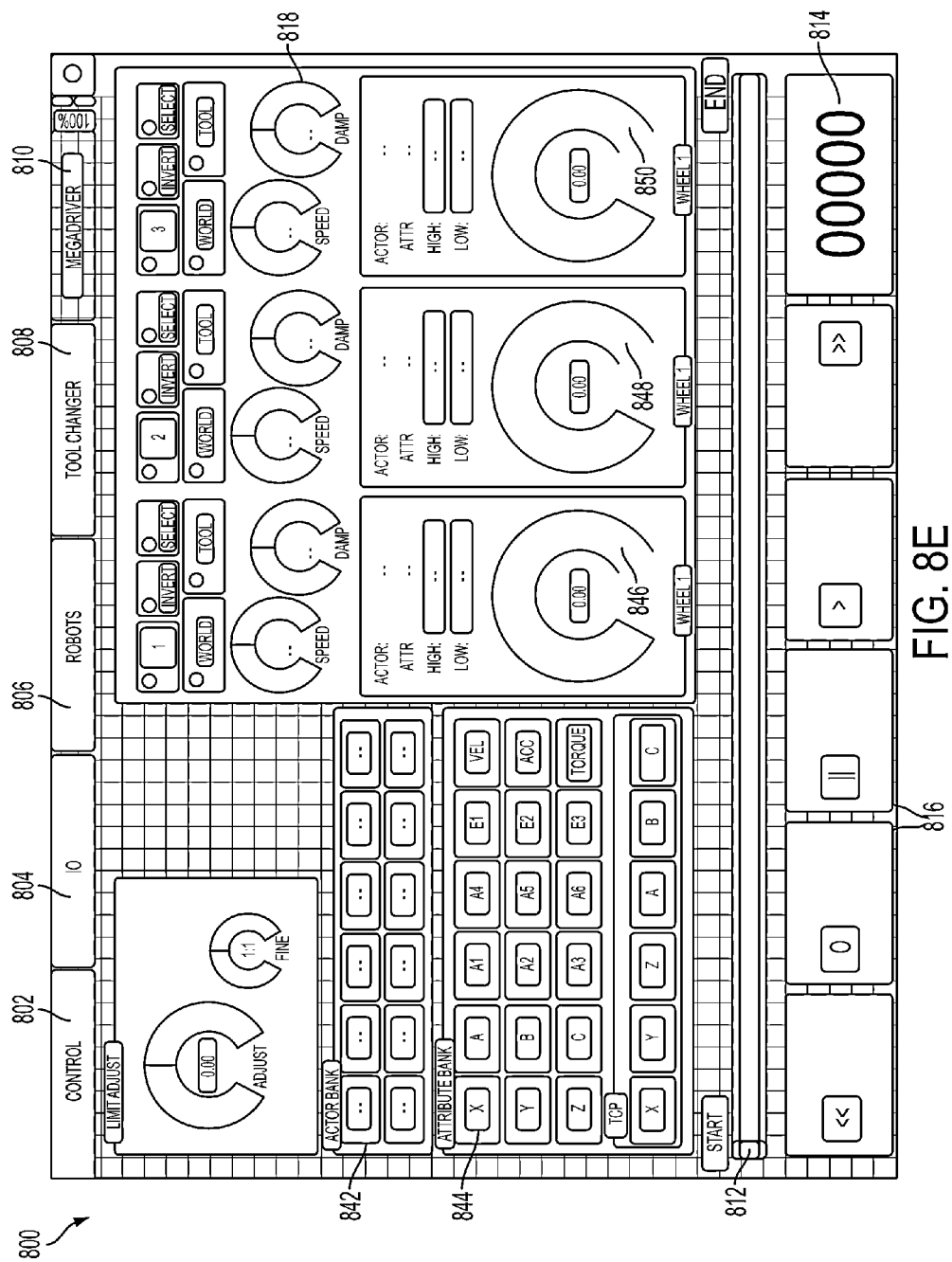
FIG. 8E illustrates a yet further view of a digital interface, according to an example embodiment.

FIG. 8E shows a further view of digital interface 800, according to an example embodiment. In particular, megadriver submenu 810 may be selected within digital interface 800. Within the megadriver submenu 810, controls may be provided for changing multiple parameters simultaneously. For example, different attributes describing one or more robot actors may be selected by a user and then modified within the digital interface during runtime.

In some examples, the digital interface may include an actor bank 842 listing the active robot actors within a physical workcell. The digital interface may additionally include an attribute bank 844, which may include any of the attributes describing robot actors, IO, or tools as previously described. For instance, in some examples, attributes related to positions of robot actors, power supplied to particular physical tool, or a rate of execution of robot operations by a particular robot actor may be included within attribute bank 844.

In further examples, a user may be able to adjust or override particular parameters from the attribute bank 844 during runtime. In some examples, numerical values may be selected by a user in order to override a parameter and send an interrupt signal to a control system that is sending signals to control motion and operation of the robot actors. In other examples, one or more digital wheels 846, 848, 850 may be supplied in order to adjust parameters during runtime. For instance, by moving a digital marker within one of the digital wheels, a user may increase the speed of a particular robot's operation, decrease the amount of force supplied by a gripper to avoid breaking a piece of material, or otherwise affect the building process.

In other examples, the digital interface may contain different menus or different divisions of controls. In further examples, the digital interface may be configurable by a user. For example, particular controls relevant to a particular manufacturing process or a particular part of a manufacturing process may be selected to be displayed within the digital interface. Other types of user interfaces may be used as well.

Figure 9:
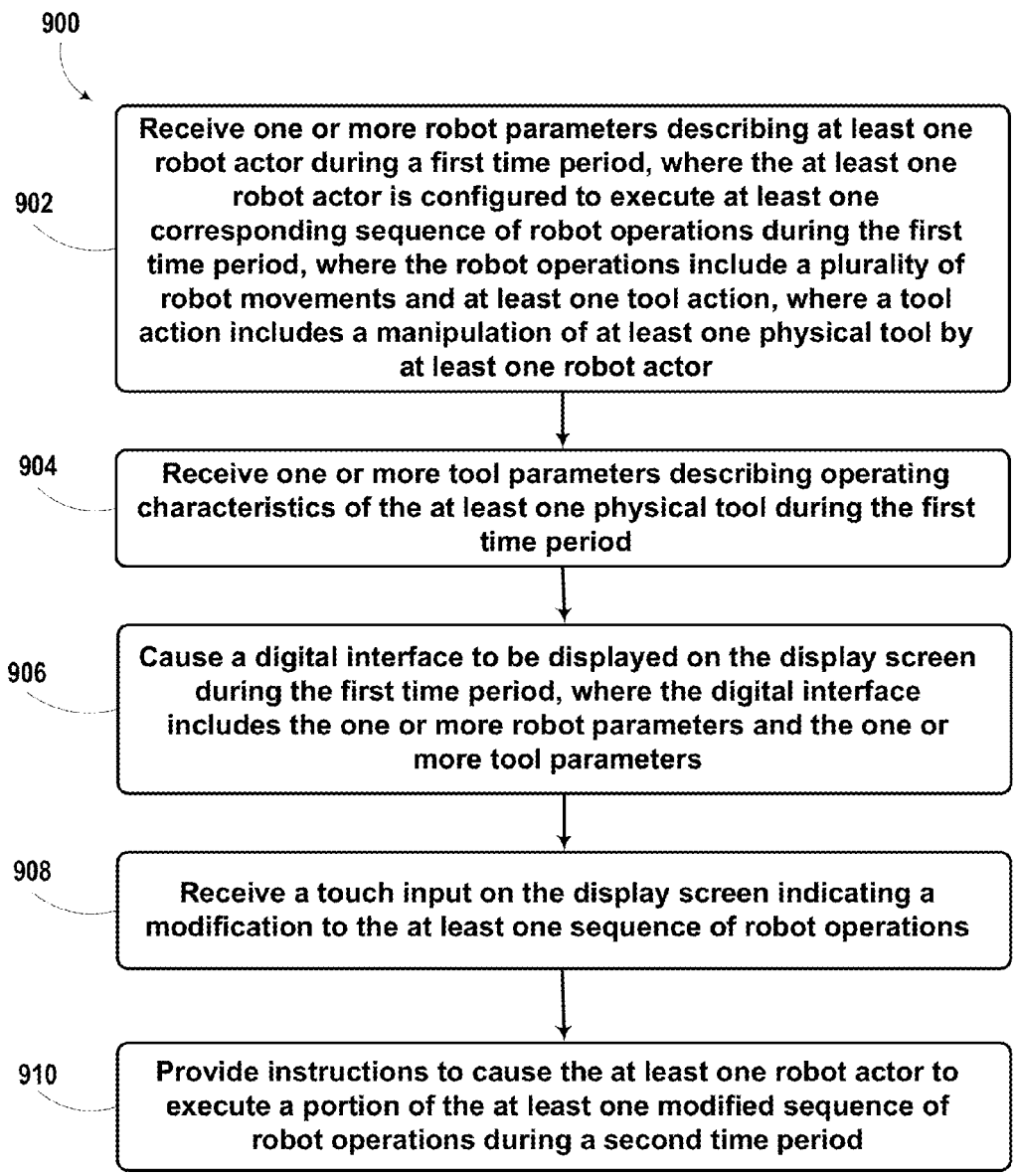
FIG. 9 is a flow chart of another example method, according to an example embodiment.

FIG. 9 shows a flow chart of another method, according to an example embodiment. In particular, FIG. 9 shows a method 900 that may be executed by a mobile computing device that contains a display screen and a control system, such as a device with a touch-based digital interface. In some examples, the mobile computing device could operate as independent manual control 28 as described with respect to FIG. 1. In further examples, the mobile computing device could be any of the types of mobile computing devices described with respect to FIG. 7.

As shown by block 902 of FIG. 9, method 900 may involve receiving one or more robot parameters describing one or more robot actors during a first time period. The robot actors could be configured to execute corresponding sequences of robot operations during the first time period, including robot movements and tool actions. The robot actors, robot parameters, and robot operations may be any of the types previously described (e.g., with respect to FIG. 7). The robot parameters may be received from a control system, such as manufacture control system 100, master control 10, and/or software control 26 as described in reference to FIG. 1. In some examples, some or all of the robot parameters may be received from control systems located on the robot actors as well or instead. In further examples, some or all of the robot parameters may be received from one or more sensors located within a physical workcell as well or instead.

As shown by block 904 of FIG. 9, method 900 may further involve receiving one or more tool parameters describing operating characteristics of at least one physical tool during the first time period. The tool parameters and physical tools could be any of the types previously described (e.g., with respect to FIG. 7). The tool parameters may received from any or all of the sources from which the robot parameters are received. In some examples, the tool parameters may be received from a different source as the robot parameters within a particular workcell as well.

As shown by block 906 of FIG. 9, method 900 may further involve causing a digital interface to be displayed on the display screen during the first time period. Within examples, the digital interface could include any or all of the views illustrated and previously described with respect to FIGS. 8A-8E. In particular, the digital interface may include the received robot parameters and tool parameters. In some examples, the robot parameters and tool parameters may be displayed within separate submenus within the digital interface.

As shown by block 908 of FIG. 9, method 900 may further involve receiving a touch input on the display screen indicating a modification to one or more of the preplanned sequences of robot operations. The modification could be any of the types of modifications to sequences of robot operations described previously with respect to FIG. 7. For example, a robot parameter or tool parameter may be overridden, a rate of execution may be modified, one or more robot operations within a sequence may be skipped, or a tool change operation may be commanded. In further examples, different types of controls within a digital interface as previously described (e.g., digital timelines, digital wheels, or dropdown menus) may be used to receive the touch input.

As shown by block 910 of FIG. 9, method 900 may further involve providing instructions to cause the robot actors to execute a portion of the modified sequences of robot operations during a second time period. In particular, the modification to the preplanned sequences of robot operations may correspond to the touch input received on the display screen (e.g., overriding a particular tool parameter may cause a corresponding effect in the tool's operation by a robot actor). The instructions could indicate the touch input received in order to enable a control system to make the necessary modifications to the building process occurring within a physical workcell. For instance, the instructions may be provided by communicating the instructions to a control system, such as manufacture control system 100, master control 10, and/or software control 26 as described in reference to FIG. 1. In some examples, the instructions may be transmitted directly to one or more robot actors as well or instead.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information, such as a block of method 1100 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claim.

What is claimed is:

1. A mobile computing device comprising:
a display screen; and
a control system configured to:
receive, from a timing computer that is in communication with a plurality of robots, a current position within a global timeline, wherein each of the plurality of robots is configured to execute a respective preplanned sequence of robot operations as part of a coordinated manufacturing process to construct an output product within a shared workcell, wherein the respective preplanned sequence of robot operations for each of the plurality of robots is synchronized to the global timeline;
cause a digital interface to be displayed on the display screen, wherein the digital interface comprises a digital marker that progresses through the global timeline based on the received current position within the global timeline as each of the plurality of robots executes robot operations from the respective preplanned sequence of robot operations, wherein the digital interface further comprises a rewind command;
after execution of a first portion of the respective preplanned sequence of robot operations by each of the plurality of robots, receive, from the digital interface, an input signal indicating a modification to the progression of the digital marker through the global timeline, wherein the input signal indicates selection of the rewind command; and
in response to receiving the input signal, provide instructions to the timing computer to cause each of the plurality of robots to adjust execution of the respective preplanned sequence of robot operations according to the indicated modification to the progression of the digital marker through the global timeline such that each of the plurality of robots maintains synchronization with the global timeline, wherein the instructions are provided to cause at least one robot of the plurality to execute one or more additional tool actions to operate on the output product in order to reverse an effect of one or more previously executed tool actions by the at least one robot on the output product.

2. The computing device of claim 1, wherein the input signal indicates a change of position of the digital marker within the global timeline, and wherein the control system is further configured to:
cause the indicated change of position of the digital marker within the global timeline on the display screen based on the input signal; and
provide instructions to the timing computer to cause each of the plurality of robots to skip one or more respective robot operations based on the change of position of the digital marker within the global timeline.

3. The computing device of claim 1, wherein the control system is further configured to:
cause a plurality of digital wheels corresponding to the plurality of robots to be displayed within the display interface, wherein each digital wheel comprises a digital marker indicating a rate at which robot operations are executed by a corresponding robot;
receive an additional input signal indicating a change of position of a particular digital marker within a particular digital wheel of the plurality of digital wheels;
cause a change of position of the particular digital marker within the particular digital wheel based on the additional input signal; and
provide instructions to cause a particular robot corresponding to the particular digital wheel to change the rate at which robot operations are executed by the particular robot according to the change of position of the particular digital marker within the particular digital wheel.

4. The computing device of claim 1, wherein the control system is further configured to:
cause a particular tool parameter to be displayed on the display interface;
receive an additional input signal indicating a modification to the particular tool parameter; and
provide instructions to cause a particular robot that is operating a particular physical tool corresponding to the particular tool parameter to adjust operation of the particular physical tool according to the modification to the particular tool parameter.

5. The computing device of claim 4, wherein the particular tool parameter comprises an amount of power supplied to the particular physical tool.

6. The computing device of claim 4, wherein the particular tool parameter comprises a rate of speed of operation of the particular physical tool.

7. The computing device of claim 4, wherein the control system is further configured to:
provide for display within the digital interface of a digital wheel with an additional digital marker to indicate the particular tool parameter; and
adjust a position of the additional digital marker within the digital wheel based on the additional input signal.

8. The computing device of claim 1, wherein the control system is further configured to:
cause information describing one or more available physical tools within a tool rack to be displayed within the display interface; and
provide instructions to cause one of the plurality of robots to equip one of the available physical tools within the tool rack based on additional touch input.

9. The computing device of claim 1, wherein the input signal indicates a change to a rate of progression of the digital marker through the global timeline, and wherein the control system is further configured to provide instructions to the timing computer to cause each of the plurality of robots to change a respective rate at which robot operations are executed by each of the plurality of robots according to the change to the rate of progression of the digital marker through the global timeline.

10. The computing device of claim 1, wherein the input signal indicates a change of position of the digital marker within the global timeline, and wherein the control system is further configured to:
cause the indicated change of position of the digital marker within the global timeline on the display screen based on the input signal; and
provide instructions to the timing computer to cause each of the plurality of robots to repeat one or more respective robot operations based on the change of position of the digital marker within the global timeline.

11. The computing device of claim 1, wherein the control system is further configured to:
provide for display of a plurality of multipliers within the digital interface, wherein the input signal indicates a selection of one of the plurality of multipliers; and
in response to the input signal, provide instructions to the timing computer to cause each of the plurality of robots to execute robot operations at respective rates of execution that are scaled based on the selected multiplier.

12. A method, comprising:
receiving, from a timing computer that is in communication with a plurality of robots, a current position within a global timeline, wherein each of the plurality of robots is configured to execute a respective preplanned sequence of robot operations as part of a coordinated manufacturing process to construct an output product within a shared workcell, wherein the respective preplanned sequence of robot operations for each of the plurality of robots is synchronized to the global timeline;
causing a digital interface to be displayed on a display screen, wherein the digital interface comprises a digital marker that progresses through the global timeline based on the received current position within the global timeline as each of the plurality of robots executes robot operations from the respective preplanned sequence of robot operations, wherein the digital interface further comprises a rewind command;
after execution of a first portion of the respective preplanned sequence of robot operations by each of the plurality of robots, receiving, from the digital interface, an input signal indicating a modification to the progression of the digital marker through the global timeline, wherein the input signal indicates selection of the rewind command; and
in response to receiving the input signal, providing instructions to the timing computer to cause each of the plurality of robots to adjust execution of the respective preplanned sequence of robot operations according to the indicated modification to the progression of the digital marker through the global timeline such that each of the plurality of robots maintains synchronization with the global timeline, wherein the instructions are provided to cause at least one robot of the plurality to execute one or more additional tool actions to operate on the output product in order to reverse an effect of one or more previously executed tool actions by the at least one robot on the output product.

13. A non-transitory computer readable medium having stored therein instructions, that when executed by a computing system, cause the computing system to perform functions comprising:

receiving, from a timing computer that is in communication with a plurality of robots, a current position within a global timeline, wherein each of the plurality of robots is configured to execute a respective preplanned sequence of robot operations as part of a coordinated manufacturing process to construct an output product within a shared workcell, wherein the respective preplanned sequence of robot operations for each of the plurality of robots is synchronized to the global timeline;

causing a digital interface to be displayed on a display screen, wherein the digital interface comprises a digital marker that progresses through the global timeline based on the received current position within the global timeline as each of the plurality of robots executes robot operations from the respective preplanned sequence of robot operations, wherein the digital interface further comprises a rewind command;

after execution of a first portion of the respective preplanned sequence of robot operations by each of the plurality of robots, receiving, from the digital interface, an input signal indicating a modification to the progression of the digital marker through the global timeline, wherein the input signal indicates selection of the rewind command; and in response to receiving the input signal, providing instructions to the timing computer to cause each of the plurality of robots to adjust execution of the respective preplanned sequence of robot operations according to the indicated modification to the progression of the digital marker through the global timeline, wherein the instructions are provided to cause at least one robot of the plurality to execute one or more additional tool actions to operate on the output product in order to reverse an effect of one or more previously executed tool actions by the at least one robot on the output product.

* * * * *